US011607644B2

(12) United States Patent
Friesen et al.

(10) Patent No.: US 11,607,644 B2
(45) Date of Patent: Mar. 21, 2023

(54) SYSTEMS FOR GENERATING WATER USING EXOGENOUSLY GENERATED HEAT, EXOGENOUSLY GENERATED ELECTRICITY, AND EXHAUST PROCESS FLUIDS AND RELATED METHODS THEREFOR

(71) Applicant: Zero Mass Water, Inc., Scottsdale, AZ (US)

(72) Inventors: Cody Alden Friesen, Scottsdale, AZ (US); Kamil Salloum, Scottsdale, AZ (US); Jonathan Edward Goldberg, Scottsdale, AZ (US); Grant Harrison Friesen, Scottsdale, AZ (US)

(73) Assignee: SOURCE GLOBAL, PBC, Scottsdale, AZ (US)

( * ) Notice: Subject to any disclaimer, the term of this patent is extended or adjusted under 35 U.S.C. 154(b) by 895 days.

(21) Appl. No.: 16/411,048

(22) Filed: May 13, 2019

(65) Prior Publication Data
US 2019/0344214 A1    Nov. 14, 2019

Related U.S. Application Data

(60) Provisional application No. 62/670,392, filed on May 11, 2018, provisional application No. 62/670,408, filed on May 11, 2018.

(51) Int. Cl.
*B01D 53/02* (2006.01)
*B01D 53/26* (2006.01)
(Continued)

(52) U.S. Cl.
CPC .......... *B01D 53/261* (2013.01); *B01D 53/06* (2013.01); *B01D 53/30* (2013.01); *E03B 3/28* (2013.01);
(Continued)

(58) Field of Classification Search
CPC ............ B01D 2259/4009; B01D 53/06; B01D 53/261; B01D 53/30; E03B 3/28; G06Q 30/0206; G06Q 50/06; Y02A 20/00
See application file for complete search history.

(56) References Cited

U.S. PATENT DOCUMENTS 1,816,592 A    7/1931    Knapen
2,138,689 A    11/1938   Altenkirch
(Continued)

FOREIGN PATENT DOCUMENTS

CN    1774401    5/2006
CN    1325854    7/2007
(Continued)

OTHER PUBLICATIONS

Notice of Allowance dated Jun. 3, 2019 in U.S. Appl. No. 15/600,046.
(Continued)

*Primary Examiner* — Christopher P Jones
(74) *Attorney, Agent, or Firm* — Snell & Wilmer L.L.P.

(57) ABSTRACT

Systems and methods for generating water for an end user are provided herein. The systems include a water generating unit that utilizes and/or controls internal heat sources, as well as external heat, electricity, and/or fluid sources, in response to ambient conditions. The systems may be monitored, optimized, and controlled remotely.

19 Claims, 12 Drawing Sheets

(51) Int. Cl.

| | | |
|---|---|---|
| B01D 53/06 | (2006.01) | |
| B01D 53/30 | (2006.01) | |
| E03B 3/28 | (2006.01) | |
| G06Q 30/0201 | (2023.01) | |
| G06Q 50/06 | (2012.01) | |

(52) U.S. Cl.
CPC ........ *G06Q 30/0206* (2013.01); *G06Q 50/06* (2013.01); *B01D 2259/4009* (2013.01)

(56) References Cited

U.S. PATENT DOCUMENTS

| | | |
|---|---|---|
| 2,284,914 A | 6/1942 | Miller |
| 2,462,952 A | 3/1949 | Dunkak |
| 2,700,537 A | 1/1955 | Pennington |
| 2,761,292 A | 9/1956 | Coanda et al. |
| 3,102,532 A | 9/1963 | Shoemaker |
| 3,400,515 A | 9/1968 | Ackerman |
| 3,676,321 A | 7/1972 | Cummings et al. |
| 3,683,591 A | 8/1972 | Glav |
| 3,740,959 A | 6/1973 | Foss |
| 3,844,737 A | 10/1974 | Macriss et al. |
| 3,889,532 A | 6/1975 | Pilie et al. |
| 3,889,742 A | 6/1975 | Rush et al. |
| 4,054,124 A | 10/1977 | Knoos |
| 4,080,186 A | 3/1978 | Ockert |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,334,524 A | 6/1982 | McCullough |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,405,343 A | 9/1983 | Othmer |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 4,926,618 A | 5/1990 | Ratliff |
| 5,058,388 A | 10/1991 | Shaw et al. |
| 5,213,773 A | 5/1993 | Burris |
| 5,275,643 A | 1/1994 | Usui |
| 5,470,484 A | 11/1995 | McNeel |
| 5,579,647 A | 12/1996 | Calton et al. |
| 5,701,749 A | 12/1997 | Zakryk |
| 5,718,122 A | 2/1998 | Maeda |
| 5,729,981 A | 3/1998 | Markus et al. |
| 5,758,511 A | 6/1998 | Yoho et al. |
| 5,826,434 A | 10/1998 | Belding et al. |
| 5,846,296 A | 12/1998 | Krumsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B2 | 12/2002 | Lloyd et al. |
| 6,511,525 B2 | 1/2003 | Spletzer et al. |
| 6,513,339 B1 | 2/2003 | Kopko |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 | 12/2004 | Max |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,740,765 B2 | 6/2010 | Mitchell |
| 7,866,176 B2 | 1/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,187,368 B2 | 5/2012 | Shih |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 8,876,956 B2 | 11/2014 | Ball et al. |
| 9,289,718 B2 | 3/2016 | Dahlback |
| 10,357,739 B2 | 7/2019 | Friesen et al. |
| 10,469,028 B2 | 11/2019 | Friesen et al. |
| 10,632,416 B2 | 4/2020 | Friesen et al. |
| 10,835,861 B2 | 11/2020 | Friesen et al. |
| 11,159,123 B2 | 10/2021 | Friesen et al. |
| 11,160,223 B2 | 11/2021 | Friesen et al. |
| 11,266,944 B2 | 3/2022 | Friesen et al. |
| 11,281,997 B2 | 3/2022 | Friesen et al. |
| 11,285,435 B2 | 3/2022 | Friesen et al. |
| 2002/0130091 A1 | 9/2002 | Ekberg et al. |
| 2003/0091881 A1 | 5/2003 | Eisler |
| 2003/0101161 A1 | 5/2003 | Ferguson et al. |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |
| 2006/0060475 A1 | 3/2006 | Applegate et al. |
| 2006/0112709 A1 | 6/2006 | Boyle |
| 2006/0130654 A1 | 6/2006 | King et al. |
| 2006/0288709 A1* | 12/2006 | Reidy ............... F25B 21/02 62/3.4 |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1* | 12/2007 | Tyls ................ E03B 3/28 62/317 |
| 2008/0135495 A1 | 6/2008 | Sher |
| 2008/0168789 A1* | 7/2008 | Jones .............. B01D 5/0039 62/291 |
| 2008/0202944 A1 | 8/2008 | Santoli et al. |
| 2008/0224652 A1 | 9/2008 | Zhu et al. |
| 2008/0245092 A1 | 10/2008 | Forsberg et al. |
| 2008/0289352 A1 | 11/2008 | Parent |
| 2009/0025711 A1 | 1/2009 | Edwards et al. |
| 2009/0093916 A1 | 4/2009 | Parsonnet et al. |
| 2009/0173376 A1 | 7/2009 | Spencer et al. |
| 2009/0211276 A1 | 8/2009 | Forkosh |
| 2009/0223514 A1 | 9/2009 | Smith et al. |
| 2010/0083673 A1 | 4/2010 | Meritt |
| 2010/0170499 A1 | 7/2010 | Bar |
| 2010/0192605 A1 | 8/2010 | Fang et al. |
| 2010/0212348 A1 | 8/2010 | Oh |
| 2010/0242507 A1 | 9/2010 | Meckler |
| 2010/0275629 A1 | 11/2010 | Erickson |
| 2010/0275775 A1 | 11/2010 | Griffiths et al. |
| 2010/0294672 A1 | 11/2010 | Gahr et al. |

(56) References Cited

U.S. PATENT DOCUMENTS

| | | |
|---|---|---|
| 2010/0300868 A1 | 12/2010 | Pirone |
| 2011/0048039 A1 | 3/2011 | Kohavi et al. |
| 2011/0056220 A1 | 3/2011 | Caggiano |
| 2011/0083458 A1 | 4/2011 | Takakura et al. |
| 2011/0132027 A1 | 6/2011 | Gommed et al. |
| 2011/0232485 A1 | 9/2011 | Ellsworth |
| 2011/0247353 A1 | 10/2011 | Metz |
| 2011/0296858 A1 | 12/2011 | Caggiano |
| 2012/0006193 A1 | 1/2012 | Roychoudhury |
| 2012/0125020 A1 | 5/2012 | Vandermeulen et al. |
| 2012/0227582 A1 | 9/2012 | Wamstad et al. |
| 2013/0227879 A1 | 9/2013 | Lehky |
| 2013/0269522 A1 | 10/2013 | DeValve |
| 2013/0312451 A1 | 11/2013 | Max |
| 2013/0318790 A1 | 12/2013 | Becze et al. |
| 2013/0319022 A1 | 12/2013 | Becze et al. |
| 2014/0034475 A1 | 2/2014 | Kamen et al. |
| 2014/0053580 A1* | 2/2014 | Ferreira .................. F25D 21/06 62/140 |
| 2014/0110273 A1 | 4/2014 | Bar-or et al. |
| 2014/0138236 A1 | 5/2014 | White |
| 2014/0157985 A1 | 6/2014 | Scovazzo et al. |
| 2014/0173769 A1 | 6/2014 | Leyns et al. |
| 2014/0260389 A1* | 9/2014 | Sistla .................... F28D 1/0477 62/222 |
| 2014/0317029 A1 | 10/2014 | Matsuoka et al. |
| 2015/0033774 A1 | 2/2015 | Ferreira et al. |
| 2015/0136666 A1 | 5/2015 | Zamir et al. |
| 2015/0194926 A1 | 7/2015 | Bushong, Jr. |
| 2016/0073589 A1 | 3/2016 | McNamara |
| 2016/0131401 A1 | 5/2016 | Otanicar et al. |
| 2016/0162456 A1 | 6/2016 | Munro et al. |
| 2016/0187287 A1 | 6/2016 | Tajiri et al. |
| 2016/0197364 A1 | 7/2016 | Rama |
| 2016/0244951 A1 | 8/2016 | Yui |
| 2016/0333553 A1 | 11/2016 | Dorfman |
| 2017/0013810 A1 | 1/2017 | Grabell |
| 2017/0024641 A1 | 1/2017 | Wierzynski |
| 2017/0203974 A1 | 7/2017 | Riedl et al. |
| 2017/0323221 A1 | 11/2017 | Chaudhuri et al. |
| 2017/0354920 A1 | 12/2017 | Friesen et al. |
| 2017/0371544 A1 | 12/2017 | Choi et al. |
| 2018/0043295 A1 | 2/2018 | Friesen et al. |
| 2018/0209123 A1* | 7/2018 | Bahrami .............. B01D 5/0075 |
| 2019/0025273 A1 | 1/2019 | Brondum |
| 2019/0102695 A1 | 4/2019 | Biswas et al. |
| 2019/0171967 A1 | 6/2019 | Friesen et al. |
| 2019/0254243 A1 | 8/2019 | Friesen et al. |
| 2019/0336907 A1 | 11/2019 | Friesen et al. |
| 2019/0344214 A1* | 11/2019 | Friesen .................. E03B 3/28 |
| 2019/0372520 A1 | 12/2019 | Friesen et al. |
| 2020/0055753 A1 | 2/2020 | Minor et al. |
| 2020/0122083 A1 | 4/2020 | Friesen et al. |
| 2020/0124566 A1 | 4/2020 | Johnson et al. |
| 2020/0140299 A1 | 5/2020 | Friesen et al. |
| 2020/0209190 A1 | 7/2020 | Johnson et al. |
| 2020/0269184 A1 | 8/2020 | Friesen et al. |
| 2020/0283997 A1 | 9/2020 | Salloum et al. |
| 2020/0286997 A1 | 9/2020 | Wu et al. |
| 2020/0300128 A1 | 9/2020 | Friesen et al. |
| 2021/0062478 A1 | 3/2021 | Friesen et al. |
| 2021/0305935 A1 | 9/2021 | Friesen et al. |
| 2022/0039341 A1 | 2/2022 | Friesen et al. |
| 2022/0127172 A1 | 4/2022 | Friesen et al. |
| 2022/0136270 A1* | 5/2022 | Gamboa ............... E04H 4/1281 4/490 |
| 2022/0156648 A1 | 5/2022 | Friesen et al. |

FOREIGN PATENT DOCUMENTS

| | | |
|---|---|---|
| CN | 101589282 | 11/2009 |
| CN | 102042645 | 5/2011 |
| CN | 102297503 | 12/2011 |
| CN | 102422089 | 4/2012 |
| CN | 102441320 | 5/2012 |
| CN | 102733451 | 10/2012 |
| CN | 202850099 | 4/2013 |
| CN | 103889892 | 6/2014 |
| CN | 203777907 | 8/2014 |
| CN | 104813107 | 7/2015 |
| CN | 204510348 U | 7/2015 |
| CN | 105531547 | 4/2016 |
| DE | 4215839 | 11/1993 |
| EP | 1139554 | 10/2001 |
| EP | 2305362 | 4/2011 |
| EP | 2326890 | 6/2011 |
| FR | 2813087 | 2/2002 |
| JP | H06142434 | 5/1994 |
| JP | H09285412 | 10/1997 |
| JP | 2002-126441 | 5/2002 |
| JP | 2003-148786 | 5/2003 |
| JP | 2012101169 | 5/2012 |
| KR | 20000003525 | 2/2000 |
| WO | 1999007951 | 2/1999 |
| WO | 20060129200 | 12/2006 |
| WO | 2007041804 | 4/2007 |
| WO | 2007051886 | 5/2007 |
| WO | 20080018071 | 2/2008 |
| WO | 2009043413 | 4/2009 |
| WO | 2012009024 | 1/2012 |
| WO | 2012128619 | 9/2012 |
| WO | 2012162760 | 12/2012 |
| WO | 2013026126 | 2/2013 |
| WO | 2013182911 | 12/2013 |
| WO | 2014085860 | 6/2014 |
| WO | 2015054435 | 4/2015 |
| WO | 2016053162 | 4/2016 |
| WO | 20160081863 | 5/2016 |
| WO | 2016138075 | 9/2016 |
| WO | 2016187709 | 12/2016 |
| WO | 2017177143 | 10/2017 |
| WO | 2017201405 | 11/2017 |
| WO | 2019014599 | 1/2019 |
| WO | 2019050861 | 3/2019 |
| WO | 2019050866 | 3/2019 |
| WO | 2019071202 | 4/2019 |
| WO | 2019113354 | 6/2019 |
| WO | 2019161339 | 8/2019 |
| WO | 2020082038 | 4/2020 |
| WO | 2020086621 | 4/2020 |
| WO | 2021154739 | 8/2021 |

OTHER PUBLICATIONS

Non-Final Office Action dated Feb. 5, 2019 in U.S. Appl. No. 15/482,104.

Notice of Allowance dated Jun. 27, 2019 in U.S. Appl. No. 15/482,104.

Non-Final Office Action dated Aug. 9, 2019 in U.S. Appl. No. 16/517,435.

International Search Report and Written Opinion dated Apr. 29, 2016 in Application No. PCT/US2015/061921.

International Search Report and Written Opinion dated Aug. 16, 2017 in Application No. PCT/US2017/033540.

International Search Report and Written Opinion dated Jun. 19, 2017 in Application No. PCT/US2017/026609.

International Search Report and Written Opinion dated Dec. 3, 2018 in Application No. PCT/US2018/049411.

International Search Report and Written Opinion dated Dec. 3, 2018. Application No. PCT/US2018/049398.

International Search Report and Written Opinion dated Jan. 15, 2019 in Application No. PCT/US2018/054715.

International Search Report and Written Opinion dated Mar. 6, 2019 in Application No. PCT/US2018/042098.

International Search Report and Written Opinion dated Mar. 29, 2019 in Application No. PCT/US2018/064308.

International Search Report and Written Opinion dated Jun. 6, 2019 in Application No. PCT/US2019/018431.

European Search Report dated Jun. 7, 2019 in U.S. Appl. No. 15/825,979.

(56) References Cited

OTHER PUBLICATIONS

Office Action dated Oct. 31, 2019 in Chinese Application No. 201780033378.3.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews, vol. 41, pp. 143-161 (2015).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys. vol. 10, pp. 11519-11533 (2010).
European Solar Thermal Industry Federation (ESTIF), "Key Issues for Renewable Heat in Europe (K4RES-H)," Solar Assisted Cooling—WP3, Task 3.5, Contract EIE/04/204/S07.38607, pp. 1-21 (2006).
Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).
Kassem et al., "Solar Powered Dehumidification Systems Using Desert Evaporative Coolers: Review," International Journal of Engineering and Advanced Technology {IJEAT), ISSN: 2249-8958, vol. 3, Issue 1 (2013).
Kolewar et al., "Feasability of Solar Desiccant Evaporative Cooling: A Review," International Journal of Scientific & Engineering Research, ISSN: 2229-5518, vol. 5, Issue 10 (2014).
La et al., "Technical Development of Rotary Desiccant Dehumidification and Air Conditioning: A Review," Renewable and Sustainable Energy Reviews, vol. 14, pp. 130-147 (2010).
Nia et al., "Modeling and Simulation of Desiccant Wheel for Air Conditioning," Energy and Buildings, vol. 38, No. 10, pp. 1230-1239 (2006).
Kozubal et al.," Desiccant Enhanced Evaporative Air-Conditioning {DEVap): Evaluation of a New Concept in Ultra Efficient Air Conditioning," National Renewal Energy Laboratory {NREL), Technical Report, NREL/TP-5500-49722 (2011).
Critoph et al., "Solar Energy for Cooling and Refrigeration," Engineering Department, University of Warwick, Coventry CV4 7AL, United Kingdom (1997).
Wahlgren, "Atmospheric Water Vapour Processor Designs for Potable Water Production: A Review," Wat. Res., vol. 35, No. 1, pp. 1-22 (2001).
Gad et al., "Application of a Solar Desiccant/Collector System for Water Recovery From Atmospheric Air," Renewal Energy, vol. 22, No. 4, pp. 541-556 (2001).
William et al., "Desiccant System for Water Production From Humid Air Using Solar Energy," Energy, vol. 90, pp. 1707-1720 (2015).
Final Office Action dated Apr. 27, 2020 in U.S. Appl. No. 15/528,366.
Non-Final Office Action dated Jun. 1, 2020 in U.S. Appl. No. 16/167,295.
Non-Final Office Action dated May 15, 2020 in U.S. Appl. No. 16/791,895.
International Search Report and Written Opinion dated Mar. 19, 2020 in Application No. PCT/US2019/057081.
PCT; International Search Report and Written Opinion dated Jul. 29, 2019 in PCT International Application No. PCT/US19/32066.
Final Office Action dated Apr. 13, 2021 in U.S. Appl. No. 16/167,295.
Non-Final Office Action dated Apr. 30, 2021 in U.S. Appl. No. 16/278,608.
International Search Report and Written Opinion dated Apr. 6, 2021 in Application No. PCT/US2021/015106.
Office Action dated Apr. 6, 2021 in Chinese Application No. 201780033378.3.
Office Action dated Apr. 28, 2021 in India Patent Application No. 20181704169.
Office Action dated May 18, 2021 in Philippines Application No. 1/2020/500092.
USPTO, Notice of Allowance dated Jun. 19, 2020 in U.S. Appl. No. 15/528,366.
International Search Report and Written Opinion dated Jun. 15, 2020 in Application No. PCT/US2020/029401.
Non-Final Office Action dated Jan. 17, 2020 in U.S. Appl. No. 15/528,366.
Notice of Allowance dated Jan. 31, 2020 in U.S. Appl. No. 16/517,435.
International Search Report and Written Opinion dated Jan. 28, 2020 in Application No. PCT/US2019/057492.
European Search Report dated Jan. 28, 2020 in European Application No. 15825979.
Office Action dated Feb. 4, 2020 in Brazilian Application No. 112017021842.9.
Non-Final Office Action dated Jul. 20, 2021 in U.S. Appl. No. 16/211,896.
Non-Final Office Action dated Jul. 26, 2021 in U.S. Appl. No. 16/630,824.
Non-Final Office Action dated Aug. 24, 2021 in U.S. Appl. No. 16/657,935.
Office Action dated Jul. 15, 2021 in Japanese Patent Application No. 2019-503636.
Office Action dated Aug. 4, 2021 in Chinese Application No. 201780033378.3.
PV Performance Modeling Collaborative. Irradiance & Insolation. Accessed Aug. 18, 2021 at https://pvpmc.sandia.gov/ modeling-steps/1-weather-design-inputs/irradiance-and-insolation-2/ (2014).
ACS. A Single-Layer Atmosphere Model. Accessed on Aug. 17, 2021 at https://www.acs.org/content/acs/en/ climatescience/atmosphericwarming/singlelayermodel.html (2012).
Materials Technology. UV Exposure Across Surface of Earth. Accessed Aug. 17, 2021 at http://www.drb-mattech.co.uk/uv %20map.html (2010).
Notice of Allowance dated Oct. 20, 2021 in U.S. Appl. No. 16/820,587.
Notice of Allowance dated Nov. 10, 2021 in U.S. Appl. No. 16/211,896.
Final Office Action dated Dec. 20, 2021 in U.S. Appl. No. 16/791,895.
Office Action dated Nov. 1, 2021 in Chinese Application No. 201780033378.3.
Office Action dated Oct. 20, 2021 in Chinese Patent Application No. 201780044144.9.
Final Office Action dated Oct. 15, 2020 in U.S. Appl. No. 16/791,895.
Non-Final Office Action dated May 11, 2022 in U.S. Appl. No. 16/411,048.
Non-Final Office Action dated May 6, 2022 in U.S. Appl. No. 16/855,965.
Non-Final Office Action dated Mar. 2, 2022 in U.S. Appl. No. 16/630,824.
Notice of Allowance dated Feb. 4, 2022 in U.S. Appl. No. 16/644,465.
Notice of Allowance dated Mar. 7, 2022 in U.S. Appl. No. 16/644,487.
International Search Report and Written Opinion dated Feb. 16, 2022 in Application No. PCT/US2021/056910.

* cited by examiner

SYSTEMS FOR GENERATING WATER USING EXOGENOUSLY GENERATED HEAT, EXOGENOUSLY GENERATED ELECTRICITY, AND EXHAUST PROCESS FLUIDS AND RELATED METHODS THEREFOR

CROSS-REFERENCE TO RELATED APPLICATIONS

This application claims the benefit of priority to U.S. Provisional Patent Application No. 62/670,392, titled SYSTEMS FOR GENERATING WATER USING EXOGENOUSLY GENERATED HEAT, EXOGENOUSLY GENERATED ELECTRICITY, AND EXHAUST PROCESS FLUIDS AND RELATED METHODS THEREFOR and filed May 11, 2018, and U.S. Provisional Patent Application No. 62/670,408, titled SYSTEMS FOR GENERATING WATER USING EXOGENOUSLY GENERATED HEAT, EXOGENOUSLY GENERATED ELECTRICITY, AND EXHAUST PROCESS FLUIDS AND RELATED METHODS THEREFOR and filed May 11, 2018, each of which are hereby incorporated by reference in their entirety.

BACKGROUND

Devices and methods for obtaining water from atmospheric humidity have been described. However, generating water from air can be improved using additional sources when conditions are less than optimal, such as when an ambient air temperature or air relative humidity are low. These additional sources may be provided by other devices and systems operating in the surrounding environment.

Provided herein are systems and methods for generating water using a water from air device with additional external sources of process fluid, heat, and electricity.

SUMMARY

A water generating system is disclosed herein. In various embodiments, the water generating system comprises a water generating unit comprising a first endogenous heat source configured to generate heat, a desiccation device coupled the first endogenous heat source, a condenser coupled to the desiccation device, and one or more of: an exhaust process fluid source coupled to a blower of the water generating unit, an exogenous electricity source configured to generate electricity used by a second endogenous heat source of the water generating unit, wherein the second endogenous heat source is configured to generate heat, and an exogenous heat source coupled to the water generating unit and configured to generate heat.

In various embodiments, the water generating further comprises a heat exchanger configured to receive heat from the exogenous heat source. In various embodiments, the first endogenous heat source comprises a solar thermal heater. In various embodiments, the first endogenous heat source further comprises a photovoltaic cell configured to generate electricity. In various embodiments, the second endogenous heat source is an electric heater. In various embodiments, the second endogenous heat source is configured to receive electricity generated by one or more of: the photovoltaic cell and the exogenous electricity source.

In various embodiments, the water generating unit further comprises: a heat generator coupled to the desiccation device, wherein the desiccation device comprises a desiccant and a housing, and wherein the housing defines an adsorption zone and a desorption zone, a condenser coupled to the desiccation device and to the heat generator, a blower configured to receive a process fluid and move the process fluid to the adsorption zone of the desiccation device, a circulator configured to receive a regeneration fluid and operably move and repeatedly cycle the regeneration fluid from the heat generator to the desorption zone of the desiccation device to the condenser, and back to the heat generator, and an actuator configured to operably move and repeatedly cycle the desiccant, or portions thereof, between the adsorption zone and desorption zone to capture water from the process fluid received at the adsorption zone and to desorb water into the regeneration fluid received at the desorption zone.

In various embodiments, the water generating system further comprises a control system, wherein the control system is configured to control one or more of: use, by the water generating unit, of heat generated by the first endogenous heat source; use, by the water generating unit, of heat generated by the second endogenous heat source; use, by the water generating unit, of heat received by the heat exchanger; use, by the water generating unit, of exhaust process fluid generated by the exhaust process fluid source; use, by the water generating unit, of electricity generated by the exogenous heat source; use, by the water generating unit, of heat generated by the exogenous heat source; a speed at which the blower moves the process fluids; a speed at which the circulator moves the regeneration fluid; and a speed at which the actuator moves the desiccant element.

In various embodiments, the water generating unit control system communicates with one or more sensors, wherein the one or more sensors are configured to detect one or more of: an ambient air temperature at the water generating unit, an ambient air relative humidity at the water generating unit; a temperature of the exhaust process fluid; a temperature of the heat generated by the first endogenous heat source; a temperature of the heat generated by the second endogenous heat source; a heat rate of flow of the heat generated by the first endogenous heat source; a heat rate of flow of the heat generated by the second endogenous heat source; a temperature of the heat received by the heat exchanger; and a heat rate of flow of the heat received by the heat exchanger.

In various embodiments, the water generating unit control system employs a control algorithm configured to determine optimal control conditions for one or more of the blower, the circulator, and the actuator, relative to each other, as a function of one or more of: the ambient air temperature at the water generating unit; the ambient air relative humidity at the water generating unit; the temperature of the exhaust process fluid; a relative humidity of the exhaust process fluid; the temperature of the heat generated by the first endogenous heat source; the heat rate of flow of the heat generated by the first endogenous heat source; the temperature of the heat generated by the second endogenous heat source; the heat rate of flow of the heat generated by the second endogenous heat source; the temperature of the heat received by the heat exchanger; and the heat rate of flow of the heat received by the heat exchanger.

In various embodiments, a method of generating water using a water generating system is disclosed herein. In various embodiments, the method comprises evaluating whether to use exogenous electricity to generate water with a water generating unit, wherein the water generating unit comprises a desiccation device, a condenser, and at least one of: a first endogenous heat source configured to generate heat, and a second endogenous heat source configured to generate heat, wherein the condenser, and the at least one of the first endogenous heat source and the second endogenous heat source, are in fluid communication with the desiccation device, making the exogenous electricity available to the second endogenous heat source, wherein the exogenous electricity is generated by an exogenous electricity source, generating heat with the second endogenous heat source, and generating water using the heat generated by the second endogenous heat source.

A system is disclosed herein. In various embodiments, the system comprises a tangible, non-transitory memory configured to communicate with a processor, the tangible, non-transitory memory having instructions stored thereon that, in response to execution by the processor, cause the processor to perform operations comprising a method as disclosed herein. In various embodiments, the method further comprises making the second endogenous heat source available to one or more regeneration fluids in the water generating unit.

In various embodiments, the evaluating whether to use the exogenous electricity to generate water with a water generating unit comprises determining one or more of: a buy back rate of the electricity generated by the exogenous electricity source; a temperature of an inverter of the exogenous electricity source; an available electric power of the electricity generated by the exogenous electricity source; and a potential available electric power of the electricity generated by the exogenous electricity source. In various embodiments, the method further comprises making available, by an exogenous heat source, heat to a heat exchanger of the water generating unit, and making available, by an exhaust process fluid source, an exhaust process fluid to the water generating unit, wherein the evaluating whether to use the exogenous electricity to generate water with the water generating unit further comprises determining one or more of: an ambient air temperature at the water generating unit; an ambient air relative humidity at the water generating unit; a temperature of the exhaust process fluid; a relative humidity of the exhaust process fluid; a temperature of the heat generated by the first endogenous heat source; a heat rate of flow of the heat generated by the first endogenous heat source; a temperature of the heat generated by the second endogenous heat source; a heat rate of flow of the heat generated by the second endogenous heat source; a temperature of the heat received by the heat exchanger; and a heat rate of flow of the heat received by the heat exchanger.

A method of generating water using a water generating system is disclosed herein. In various embodiments, the method comprises evaluating whether to use exogenous heat to generate water with a water generating unit, wherein the water generating unit comprises a desiccation device, a condenser, and one or more of: a first endogenous heat source configured to generate heat, and a heat exchanger configured to receive heat from an exogenous heat source, wherein the condenser, and at least one of the first endogenous heat source and the heat exchanger, are in fluid communication with the desiccation device, making available, by the exogenous heat source, exogenous heat to the heat exchanger, and generating water using the exogenous heat.

A system is disclosed herein. In various embodiments, the system comprises a tangible, non-transitory memory configured to communicate with a processor, the tangible, non-transitory memory having instructions stored thereon that, in response to execution by the processor, cause the processor to perform operations comprising a method disclosed herein. In various embodiments, the evaluating whether to use the exogenous heat source to generate water with a water generating unit comprises determining one or more of: a temperature of the exogenous heat received by the heat exchanger; a heat rate of flow of the exogenous heat received by the heat exchanger; a temperature of the heat generated by the first endogenous heat source; a heat rate of flow of the exogenous heat source; a desired size of the water generating unit; and a desired weight of the water generating unit.

In various embodiments, the method further comprises making available, by an exogenous electricity generating source, exogenous electricity to the water generating unit, and making available, by an exhaust process fluid source, exhaust process fluid to the water generating unit; wherein the evaluating whether to use the exogenous heat source to generate water further comprises determining one or more of: an ambient air temperature at the water generating unit; an ambient air relative humidity at the water generating unit; a temperature of the exhaust process fluid; a relative humidity of the exhaust process fluid; a buy back rate of the electricity generated by the exogenous electricity source; a temperature of an inverter of the exogenous electricity source; an available electric power of the electricity generated by the exogenous electricity source; and a potential available electric power of the electricity generated by the exogenous electricity source.

A method of generating water using a water generating system is disclosed herein. In various embodiments, the method comprises evaluating whether to use exhaust process fluid to generate water with a water generating unit, wherein the water generating unit comprises a desiccation device, a condenser, and one or more of: a first endogenous heat source configured to generate heat, and an exhaust process fluid source, wherein the condenser, and at least one of the first endogenous heat source and the exhaust process fluid source are in fluid communication with the desiccation device, making available, by the exhaust process fluid source, exhaust process fluid to the desiccation device, and generating water using the exhaust process fluid.

A system is disclosed herein. In various embodiments, the system comprises a tangible, non-transitory memory configured to communicate with a processor, the tangible, non-transitory memory having instructions stored thereon that, in response to execution by the processor, cause the processor to perform operations comprising a method disclosed herein. In various embodiments, the evaluating whether to use the exhaust process fluid source to generate water comprises determining one or more of: a relative humidity of the exhaust process fluid; a relative humidity of an atmospheric process fluid at the water generating unit; a back pressure acting on the exhaust pressure fluid; a flow rate of the exhaust process fluid; and a chemistry of the exhaust process fluid.

In various embodiments, the method further comprises making available, by an exogenous electricity source, exogenous electricity to a second endogenous heat source of the water generating unit, and making available, by an exogenous heat source, exogenous heat to a heat exchanger of the water generating unit, wherein the evaluating whether to use the exhaust process fluid source to generate water further comprises determining one or more of: an ambient air temperature at the water generating unit; an ambient air relative humidity at the water generating unit; a temperature of the exhaust process fluid; a relative humidity of the exhaust process fluid; a buy back rate of the electricity generated by the exogenous electricity source; a temperature of an inverter of the exogenous electricity source; an available electric power of the electricity generated by the exogenous electricity source; a potential available electric power of the electricity generated by the exogenous electricity source; a temperature of the heat received by the heat exchanger; a heat rate of flow of the heat received by the heat exchanger; a temperature of the heat generated by the first endogenous heat source; a heat rate of flow of the exogenous heat source; a temperature of the heat generated by the second endogenous heat source; a heat rate of flow of the second endogenous heat source; a desired size of the water generating unit, and a desired weight of the water generating unit.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the following drawing figures.

Figure 1:
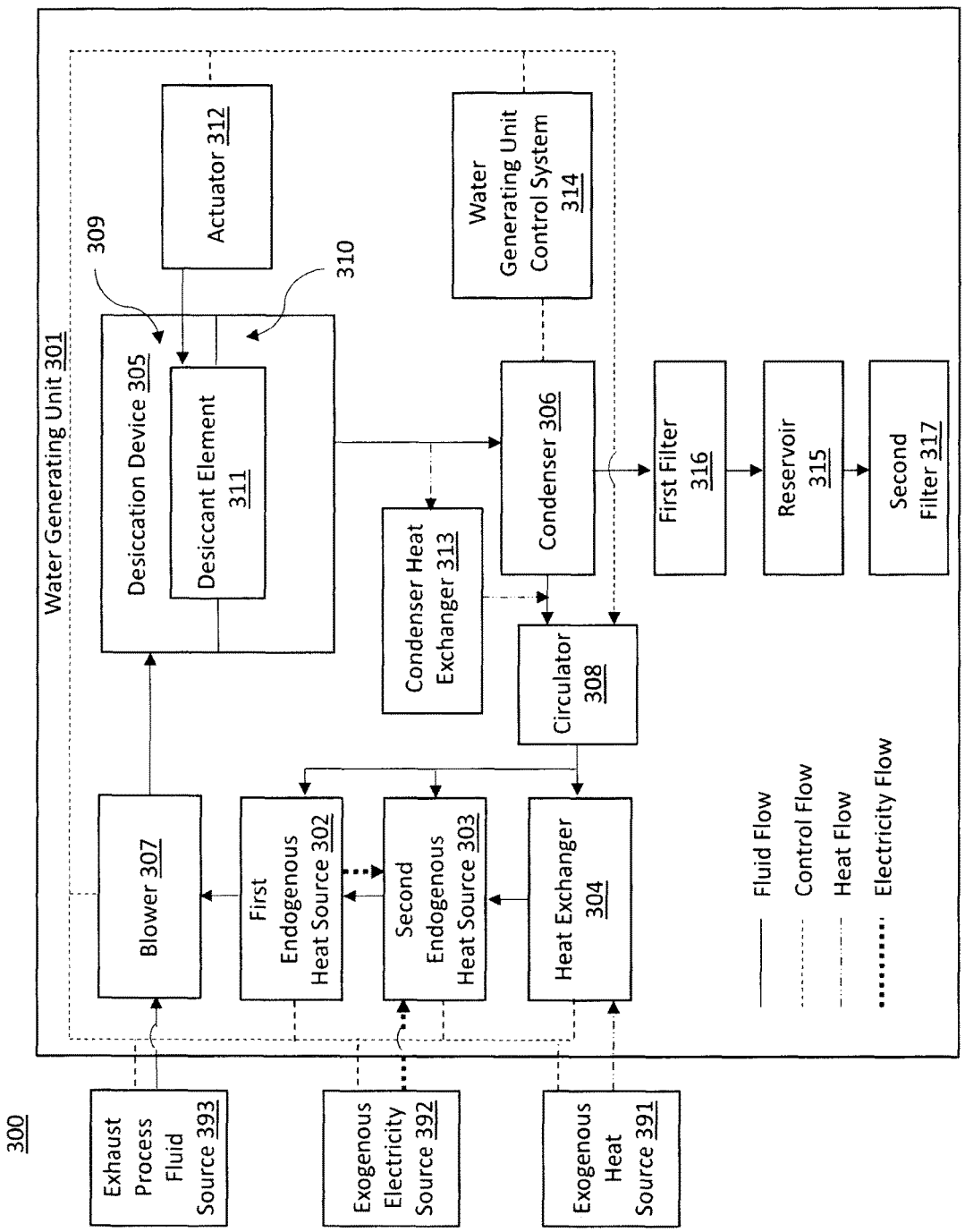
FIG. 1 illustrates a representative block diagram of a water generating system, according to various embodiments.

For simplicity and clarity of illustration, the drawing figures illustrate the general manner of construction, and descriptions and details of well-known features and techniques may be omitted to avoid unnecessarily obscuring the disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

DESCRIPTION OF ILLUSTRATIVE EMBODIMENTS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure.

Thus, the detailed description herein is presented for purposes of illustration only and not of limitation. For example, the steps recited in any of the method of process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the systems and methods described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, the terms "about" or "approximately" can, in some embodiments, mean within plus or minus ten percent of the stated value. In other embodiments, the terms "about" or "approximately" can mean within plus or minus five percent of the stated value. In further embodiments, the terms "about" or "approximately" can mean within plus or minus three percent of the stated value. In yet other embodiments, the terms "about" or "approximately" can mean within plus or minus one percent of the stated value.

Described herein are systems and methods for generating water using a water generating system that includes a water generating unit comprising one or more optional heat sources, electricity sources, and/or process fluid sources, each of which may exist and/or be generated other than by the water generating unit. The system utilizes the optional heat, electricity, and/or process fluid sources to increase the yield of water generated by the water generating system, as compared to the yield that would be generated under ambient conditions. The methods for generating water using the various heat, electricity, and process fluid sources include evaluating several factors including the ambient conditions, the productivity of the sources, the need for use of the sources to power devices other than the water generating unit, etc. Once the conditions are evaluated, the methods include deciding whether the use of some or all of the various sources is necessary and/or desired.

Referring now to the drawings, and more particularly to FIG. 1, shown therein and designated by the reference numeral 300 is a first embodiment of a water generating system 300. Water generating system 300 is merely exemplary, and embodiments of the system are not limited to the embodiments presented herein. Water generating system 300 can be employed in many different embodiments or examples not specifically depicted or described herein. In some embodiments, certain elements of water generating system 300 can perform various methods and/or activities of those methods. In these or other embodiments, the methods and/or the activities of the methods can be performed by other suitable elements of water generating system 300.

As explained in greater detail below, in various embodiments, water generating system 300 can make available water to a user of water generating system 300. In some embodiments, water generating system 300 can generate water using exogenously generated heat, exogenously generated electricity, and/or an exhaust process fluid. In many embodiments, the water made available to the user of water generating system 300 comprises the water generated by water generating system 300.

In various embodiments, water generating system 300 is implemented with hardware and/or software, as described herein. In some embodiments, at least part of the hardware and/or software is conventional, while in these or other embodiments, part or all of the hardware and/or software is customized (e.g., optimized) for implementing part or all of the functionality of water generating system 300 described herein.

Water generating system 300 comprises a water generating unit 301. In various embodiments, water generating system 300 also comprises an exogenous heat source 391, an exogenous electricity source 392, and/or an exhaust process fluid source 393. Exogenous heat source 391, exogenous electricity source 392, and/or exhaust process fluid source 393 are separate from water generating unit 301. That is, exogenous heat source 391, exogenous electricity source 392, and/or exhaust process fluid source 393 are not part of water generating unit 301.

In various embodiments, water generating unit 301 generates water, which can be made available to a user of water generating system 300. For example, in some embodiments, water generating unit 301 comprises a drinking water solar panel. A drinking water solar panel may also be referred to as a water-from-air solar panel.

In various embodiments, water generating unit 301 comprises one or more of: a first endogenous heat source 302, a second endogenous heat source 303, and/or a heat exchanger 304. In various embodiments, one or two of first endogenous heat source 302, second endogenous heat source 303, and heat exchanger 304 are omitted.

In various embodiments, water generating unit 301 comprises a desiccation device 305, a condenser 306, a blower 307, and a circulator 308. In various embodiments, desiccation device 305 comprises an adsorption zone 309, a desorption zone 310, a desiccant element 311, and an actuator 312.

In various embodiments, water generating unit 301 also comprises a condenser heat exchanger 313, a water generating unit control system 314, a reservoir 315, a first filter 316, and/or a second filter 317. In other embodiments, condenser heat exchanger 313, water generating unit control system 314, reservoir 315, first filter 316, and/or second filter 317 are omitted.

In various embodiments, first endogenous heat source 302, second endogenous heat source 303, and/or heat exchanger 304 are coupled to desiccation device 305; desiccation device 305 is coupled to condenser 306; and condenser 306 is coupled to first endogenous heat source 302, second endogenous heat source 303, and/or heat exchanger 304. In various embodiments, first endogenous heat source 302, second endogenous heat source 303, and/or heat exchanger 304 are coupled to blower 307; and blower 307 is coupled to desiccation device 305.

In various embodiments, at least one of first endogenous heat source 302, second endogenous heat source 303, and heat exchanger 304 is coupled in series with at least one other of first endogenous heat source 302, second endogenous heat source 303, and heat exchanger 304, such as, for example, between condenser 306 and desiccation device 305, or between condenser 306 and blower 307. For example, in some embodiments, first endogenous heat source 302, second endogenous heat source 303, and heat exchanger 304 are coupled in series with each other, as illustrated at FIG. 1. In various embodiments, at least one of first endogenous heat source 302, second endogenous heat source 303, and heat exchanger 304 are coupled in parallel with at least one other of first endogenous heat source 302, second endogenous heat source 303, and heat exchanger 304, such as, for example, between condenser 306 and desiccation device 305, or between condenser 306 and blower 307.

In various embodiments, circulator 308 is configured to receive one or more regeneration fluids and operably move and repeatedly cycle the regeneration fluid(s) from first endogenous heat source 302, second endogenous source 303, and/or heat exchanger 304, to blower 307, to desiccation device 305, to condenser 306, and back to first endogenous heat source 302, second endogenous heat source 303, and/or heat exchanger 304 (e.g., in a closed loop). In various embodiments, desiccation device 305, condenser 306, and, depending on the manner in which water generating system 300 is implemented, at least one of first endogenous heat source 302, second endogenous heat source 303, and/or heat exchanger 304 are coupled together by any suitable conduits configured to transfer the regeneration fluid(s) among blower 307, desiccation device 305, condenser 306, and at least one of first endogenous heat source 302, second endogenous heat source 303, and/or heat exchanger 304. Exemplary regeneration fluid(s) include humid air, one or more supersaturated or high relative humidity gases (e.g., a relative humidity greater than approximately 90%), one or more glycols, one or more ionic liquids, etc. However, the regeneration fluid may comprise any fluid suitable for use in a water generating system.

In various embodiments, circulator 308 comprises any suitable device configured to receive and move the regeneration fluid(s) from first endogenous heat source 302, second endogenous heat source 303, and/or heat exchanger 304 to blower 307 to desiccation device 305 to condenser 306 and back to first endogenous heat source 302, second endogenous heat source 303, and/or heat exchanger 304. For example, in some embodiments, circulator 308 comprises a pump.

In various embodiments, desiccation device 305 receives the regeneration fluid(s) at desorption zone 310. In various embodiments, after the regeneration fluid(s) are received at desorption zone 310, the regeneration fluid(s) are moved to condenser 306. In some of these embodiments, the regeneration fluid(s) are moved to one or more additional desiccation devices before being moved to condenser 306, as explained below.

In various embodiments, blower 307 is configured to receive one or more process fluids (e.g., one or more humid fluids) and move the process fluid(s) to desiccation device 305. For example, in some embodiments, desiccation device 305 receives the process fluid(s) at adsorption zone 309. Further, blower 307 can move the process fluid(s) through desiccation device 305 (e.g., through adsorption zone 309). In some embodiments, after the process fluid(s) are received at desiccation device 305 (e.g., adsorption zone 309), the process fluid(s) are exhausted to the atmosphere around (e.g., adjacent to) water generating unit 301. As discussed in greater detail below, desiccation device 305 can cause water in the process fluid(s) to be desorbed into the regeneration fluid(s) (e.g., by actuator 312 transferring the water in the process fluid from adsorption zone 309 to desorption zone 310), and then condenser 306 can condense the water in the regeneration fluid(s) into a liquid. Accordingly, water generating unit 301 can use the process fluid(s) to generate water.

When blower 307 is configured to receive multiple process fluids, blower 307 can receive two or more of the multiple process fluids at the same time and/or at different times. For example, in some embodiments, when blower 307 receives two or more of the multiple process fluids at the same time, one or more of the process fluids received by blower 307 can supplement one or more other process fluids received by blower 307.

In various embodiments, blower 307 is further configured to receive one or more regeneration fluids and move the regeneration fluid(s) to desiccation device 305. For example, in various embodiments, desiccation device 305 receives the regeneration fluid(s) at desorption zone 310. Further, blower 307 may move the regeneration fluid(s) through desiccation device 305 (e.g., through desorption zone 310). As discussed in greater detail below, desiccation device 305 can cause water in the process fluid(s) to be desorbed into the regeneration fluid(s) (e.g., by actuator 312 transferring the water in the process fluid from adsorption zone 309 to desorption zone 310), and then condenser 306 can condense the water in the regeneration fluid(s) into a liquid. Accordingly, water generating unit 301 can use the regeneration fluid(s) to generate water.

Blower 307 can comprise any suitable device configured to receive the process fluid(s) and/or regeneration fluid(s) and to move the process fluid(s) and/or regeneration fluid(s) to desiccation device 305. For example, in some embodiments, blower 307 comprises a pump.

In various embodiments, the process fluid(s) comprise an atmospheric process fluid (i.e., humid air). Further, blower 307 can receive the atmospheric process fluid from the atmosphere around (e.g., adjacent to) water generating unit 301. In some embodiments, the process fluid(s) excludes an atmospheric process fluid.

Meanwhile, in these or other embodiments, the process fluid(s) comprise an exhaust process fluid. However, in some embodiments, the process fluid(s) exclude an exhaust process fluid.

As used herein, the term "exhaust process fluid" can refer to a humid fluid generated by exhaust process fluid source 393. The exhaust process fluid can be distinguished from the atmospheric process fluid, which is not generated by exhaust process fluid source 393. Exhaust process fluid source 393 is discussed in greater detail below.

Further, when the process fluid(s) comprise an exhaust process fluid, blower 307 can be configured to receive the exhaust process fluid from exhaust process fluid source 393. For example, in these embodiments, blower 307 is coupled to exhaust process fluid source 393 by any suitable conduits configured to transfer the exhaust process fluid from exhaust process fluid source 393 to blower 307.

In some embodiments, at least one or all of the process fluid(s) are received by blower 307 without regulation. Meanwhile, in other embodiments, at least one or all of the process fluid(s) received by blower 307 are regulated, such as, for example, by one or more valves. For example, in some embodiments, when one or more valves are implemented to regulate when at least one or all of the process fluid(s) are received by blower 307, the valve(s) can be manually operated.

Alternatively or additionally, the valve(s) can be automatically operated, such as, for example, by water generating unit control system 314.

In various embodiments, actuator 312 is configured to operably move and repeatedly cycle desiccant element 311, or portions thereof, between adsorption zone 309 and desorption zone 310 to capture (e.g., absorb and/or adsorb) water from the process fluid(s) received at adsorption zone 309 and desorb water into the regeneration fluid(s) received at desorption zone 310. For example, in various embodiments, desiccant element 311 is disposed on a wheel located partially at adsorption zone 309 and partially at desorption zone 310. Accordingly, in these embodiments, portions of desiccant element 311 are simultaneously located at adsorption zone 309 and at desorption zone 310, such as, for example, so that desiccant element 311 can simultaneously capture (e.g., absorb and/or adsorb) water from the process fluid received at adsorption zone 309 and desorb water into the regeneration fluid(s) received at desorption zone 310.

Meanwhile, actuator 312 can operably rotate the wheel so that changing portions of desiccant element 311 are located at adsorption zone 309 and at desorption zone 310 when actuator 312 rotates the wheel. Rotation of the wheel can be discrete (e.g., stepwise) or continuous.

In various embodiments, desiccant element 311 comprises any suitable material or materials configured such that desiccant element 311 can capture (e.g., absorb and/or adsorb) and desorb water vapor. For example, the material(s) of desiccant element 311 can comprise one or more hygroscopic materials. In many embodiments, exemplary material(s) for desiccant element 311 comprise silica, silica gel, alumina, alumina gel, montmorillonite clay, one or more zeolites, one or more molecular sieves, activated carbon, one or more metal oxides, one or more lithium salts, one or more calcium salts, one or more potassium salts, one or more sodium salts, one or more magnesium 25 salts, one or more phosphoric salts, one or more organic salts, one or more metal salts, glycerin, one or more glycols, one or more hydrophilic polymers, one or more polyols, one or more polypropylene fibers, one or more cellulosic fibers, one or more derivatives thereof, and one or more combinations thereof.

In various embodiments, desiccant element 311 comprises any suitable form or forms configured such that desiccant element 311 can capture (e.g., absorb and/or adsorb) and desorb water. For example, desiccant element 311 can comprise a liquid form and/or a solid form. In further embodiments, desiccant element 311 comprises a porous solid impregnated with one or more hygroscopic material(s).

In various embodiments, desiccant element 311 is configured to capture (e.g., absorb and/or adsorb) water at one or more temperatures and/or pressures and is configured to desorb water at one or more other temperatures and/or pressures. In some embodiments, desiccant element 311 is implemented with material(s) and/or form(s), and/or can be otherwise configured such that desiccant element 311 does not capture (e.g., absorb and/or adsorb) one or more materials toxic to humans, pets, and/or other animals.

In various embodiments, condenser 306 is configured to extract water from the regeneration fluid(s) received at condenser 306, such as, for example, water that has been desorbed into the regeneration fluid(s) at desorption zone 310 of desiccation device 305. In these embodiments, condenser 306 condenses water vapor from the regeneration fluid(s) into liquid water. Accordingly, in many embodiments, condenser 306 cools the regeneration fluid(s) by extracting thermal energy from the regeneration fluid(s) in order to condense water vapor from the regeneration fluid(s) into liquid water. In some embodiments, condenser 306 transfers thermal energy extracted from the regeneration fluid(s) to the process fluid(s) upstream of desiccation device 305 and/or to the atmosphere around (e.g., adjacent to) water generating unit 301.

In various embodiments, first endogenous heat source 302, second endogenous heat source 303, and/or heat exchanger 304 are configured to provide thermal energy to the regeneration fluid(s) so that the regeneration fluid(s) are heated upon arriving at desiccation device 305. Exposing desiccant element 311 of desiccation device 305 to the heated regeneration fluid(s) at desorption zone 310 of desiccation device 305 can regenerate desiccant element 311 of desiccation device 305 by causing water to desorb from desiccant element 311 into the regeneration fluid(s), thereby permitting desiccant element 311 to absorb more water from the process fluid(s) at adsorption zone 309 and permitting condenser 306 to condense into a liquid the water desorbed from desiccant element 311 into the regeneration fluid(s).

For example, in order to provide thermal energy to the regeneration fluid(s), first endogenous heat source 302 can generate endogenously generated heat, can receive the regeneration fluid(s), and can transfer thermal energy from the endogenously generated heat generated by first endogenous heat source 302 to the regeneration fluid(s). Accordingly, water generating unit 301 can use the endogenously generated heat generated by first endogenous heat source 302 to generate water.

As used herein, the term "endogenously generated heat" can refer to heat that is generated by water generating unit 301. By contrast, as used herein, the term "exogenously generated heat" can refer to heat that is not generated by water generating unit 301.

In various embodiments, first endogenous heat source 302 comprises a solar thermal heater (e.g., a solar thermal collector). In these embodiments, the solar thermal heater can convert solar insolation to the thermal energy provided to the regeneration fluid(s). The terms "first endogenous heat source" and "first endogenous-heat-generating-system" are used interchangeably herein.

In various embodiments, first endogenous heat source 302 is configured to generate endogenously generated heat comprising a maximum endogenously generated heat temperature of approximately 80 degrees Celsius or approximately 100 degrees Celsius. In these or other embodiments, first endogenous heat source 302 is configured to generate endogenously generated heat comprising a maximum endogenously generated heat rate of flow of approximately 1,000 watts or approximately 1,200 watts.

Further, in various embodiments, first endogenous heat source 302 is part of one or more solar panels, and water generating unit 301 comprises the solar panel(s). In various embodiments, the solar panel(s) also comprise one or more photovoltaic cells configured to generate endogenously generated electricity. For example, the photovoltaic cell(s) can be configured to convert solar insolation into the endogenously generated electricity. In further embodiments, water generating unit 301 uses the endogenously generated electricity generated by the photovoltaic cell(s) to electrically power part or all of water generating unit 301. In these or other embodiments, part or all of water generating unit 301 is electrically powered by any other suitable source of endogenously generated electricity and/or any suitable source of exogenously generated electricity (e.g., exogenous electricity source 392).

As used herein, the term "endogenously generated electricity" can refer to electricity that is generated by water generating unit 301. By contrast, as used herein, the term "exogenously generated electricity" can refer to electricity that is not generated by water generating unit 301.

Further, in various embodiments, in order to provide thermal energy to the regeneration fluid(s), second endogenous heat source 303 generates endogenously generated heat, receives the regeneration fluid(s), and transfers thermal energy from the endogenously generated heat generated by second endogenous heat source 303 to the regeneration fluid(s). Accordingly, water generating unit 301 can use the endogenously generated heat generated by second endogenous heat source 303 to generate water.

In various embodiments, when water generating system 300 comprises first endogenous heat source 302 and second endogenous heat source 303, water generating unit 301 supplements the endogenously generated heat generated by first endogenous heat source 302 with the endogenously generated heat generated by second endogenous heat source 303 to generate water. In other embodiments, when water generating system 300 comprises first endogenous heat source 302 and second endogenous heat source 303, water generating unit 301 uses the endogenously generated heat generated by first endogenous heat source 302 to generate water instead of the endogenously generated heat generated by second endogenous heat source 303, and vice versa.

In various embodiments, when water generating unit 301 is configured to use endogenously generated heat generated by second endogenous heat source 303 instead of endogenously generated heat generated by first endogenous heat source 302 to generate water, first endogenous heat source 302 is omitted, or vice versa. However, in many embodiments, when water generating unit 301 is configured to use endogenously generated heat generated by second endogenous heat source 303 instead of endogenously generated heat generated by first endogenous heat source 302 to generate water, or vice versa, first endogenous heat source 302 and second endogenous heat source 303 are implemented together and operated at different times.

In various embodiments, when water generating system 300 comprises first endogenous heat source 302 and second endogenous heat source 303, first endogenous heat source 302 and/or second endogenous heat source 303 are selectively activated or deactivated, as needed, depending on whether endogenously generated heat generated by second endogenous heat source 303 is supplementing or being used instead of endogenously generated heat generated by first endogenous heat source 302, and vice versa. For example, in some embodiments, first endogenous heat source 302 and/or second endogenous heat source 303 are manually activated or deactivated. In other embodiments, alternatively or additionally, first endogenous heat source 302 and/or second endogenous heat source 303 are automatically activated or deactivated, such as, for example, by water generating unit control system 314. Further, in these or other embodiments, when water generating system 300 comprises first endogenous heat source 302 and second endogenous heat source 303, second endogenous heat source 303 is used to generate endogenously generated heat when endogenously generated heat generated by first endogenous heat source 302 is unavailable or is insufficient for use to generate water, such as, for example, when first endogenous heat source 302 comprises a solar thermal heater and sunlight is unavailable. Further, in these or other embodiments, when water generating system 300 comprises first endogenous heat source 302 and second endogenous heat source 303, first endogenous heat source 302 is used to generate endogenously generated heat when endogenously generated heat generated by second endogenous heat source 303 is unavailable or is insufficient to generate water, such as, for example, when second endogenous heat source 303 comprises an electric heater, as discussed below, and electricity is unavailable.

In various embodiments, second endogenous heat source 303 comprises an electric heater. In these embodiments, the electric heater can convert electricity to the thermal energy provided to the regeneration fluid(s), such as, for example, by passing the electricity through an electrical resistor. The terms "second endogenous heat source" and "second endogenous-heat-generating-system" are used interchangeably herein.

In various embodiments, second endogenous heat source 303 is configured to generate endogenously generated heat comprising a maximum endogenously generated heat temperature of approximately 80 degrees Celsius or approximately 100 degrees Celsius. In these or other embodiments, second endogenous heat source 303 is configured to generate endogenously generated heat comprising a maximum endogenously generated heat rate of flow of approximately 1,000 watts or approximately 1,200 watts.

In various embodiments, second endogenous heat source 303 is electrically powered by endogenously generated electricity. For example, in some embodiments, when water generating system 300 comprises first endogenous heat source 302, and when first endogenous heat source 302 is part of one or more solar panels comprising one or more photovoltaic cells configured to generate endogenously generated electricity, second endogenous heat source 303 is electrically powered by the endogenously generated electricity generated by the photovoltaic cell(s). In some of these embodiments, first endogenous heat source 302 generates endogenously generated heat to generate water while also electrically powering second endogenous heat source 303 to generate additional endogenously generated heat to generate water.

Further, in these or other embodiments, second endogenous heat source 303 is also electrically powered by exogenously generated electricity. For example, in some embodiments, second endogenous heat source 303 is electrically powered by exogenously generated electricity generated by exogenous electricity source 392 and endogenously generated heat generated by first endogenous heat source. Exogenous electricity source 392 is discussed in greater detail below.

Also, in various embodiments, second endogenous heat source 303 is electrically powered by exogenously generated electricity, such as, for example, by exogenously generated electricity generated by exogenous electricity source 392, and not by endogenously generated electricity. In further embodiments, second endogenous heat source 303 is electrically powered only by exogenously generated electricity generated by exogenous electricity source 392. In still further embodiments, second endogenous heat source 303 and no other part of water generating unit 301 is electrically powered by exogenously generated electricity generated by exogenous electricity source 392. In various embodiments, because second endogenous heat source 303 is electrically powered by exogenously generated electricity generated by exogenous electricity source 392, and because water generating unit 301 uses endogenously generated heat generated by second endogenous heat source 303 to generate water, water generating unit 301 also uses exogenously generated electricity generated by exogenous electricity source 392 to generate water.

Further, when second endogenous heat source 303 is configured to be electrically powered by exogenously generated electricity generated by exogenous electricity source 392, second endogenous heat source 303 receives the exogenously generated electricity from exogenous electricity source 392. In these embodiments, second endogenous heat source 303 is electrically coupled to exogenous electricity source 392 to transfer the exogenously generated electricity from exogenous electricity source 392 to second endogenous heat source 303.

In various embodiments, the exogenously generated electricity generated by exogenous electricity source 392 is received by second endogenous heat source 303 without regulation. In some embodiments, the exogenously generated electricity generated by exogenous electricity source 392 received by second endogenous heat source 303 is regulated, such as, for example, by one or more electrical switches. For example, in some embodiments, when one or more switch(es) are implemented to regulate when the exogenously generated electricity generated by exogenous electricity source 392 is received by second endogenous heat source 303, the switch(es) are manually operated. Alternatively or additionally, the switch(es) can be automatically operated, such as, for example, by water generating unit control system 314.

In various embodiments, in order to provide thermal energy to the regeneration fluid(s), heat exchanger 304 receives exogenously generated heat from exogenous heat source 391, receives the regeneration fluid(s), and transfers thermal energy from the exogenously generated heat to the regeneration fluid(s). Accordingly, water generating unit 301 can use the exogenously generated heat to generate water.

In various embodiments, when water generating system 300 comprises heat exchanger 304, and also comprises first endogenous heat source 302 and/or second endogenous heat source 303, water generating unit 301 supplements the endogenously generated heat generated by first endogenous heat source 302 and/or second endogenous heat source 303 with the exogenously generated heat received by heat exchanger 304 to generate water. In other embodiments, when water generating system 300 comprises heat exchanger 304, and also comprises first endogenous heat source 302 and/or second endogenous heat source 303, water generating unit 301 uses the exogenously generated heat received by heat exchanger 304 to generate water instead of the endogenously generated heat generated by first endogenous heat source 302, and vice versa, and/or instead of the endogenously generated heat generated by second endogenous heat source 303, and vice versa.

In various embodiments, when water generating unit 301 is configured to use exogenously generated heat received by heat exchanger 304 to generate water instead of the endogenously generated heat generated by first endogenous heat source 302 and/or second endogenous heat source 303 to generate water, first endogenous heat source 302 and/or second endogenous heat source 303 are omitted. However, in many embodiments, when water generating unit 301 is configured to use exogenously generated heat received by heat exchanger 304 to generate water instead of the endogenously generated heat generated by first endogenous heat source 302 to generate water, first endogenous heat source 302 and/or second endogenous heat source 303 are implemented together with heat exchanger 304 and operated at different times.

In various embodiments, when water generating system 300 comprises heat exchanger 304 and comprises first endogenous heat source 302 and/or second endogenous heat source 303, first endogenous heat source 302 and/or second endogenous heat source 303 are selectively activated or deactivated, as needed, depending on whether the exogenously generated heat received by heat exchanger 304 is supplementing or being used instead of endogenously generated heat generated by first endogenous heat source 302 and/or second endogenous heat source 303. For example, in some embodiments, first endogenous heat source 302 and/or second endogenous heat source 303 are manually activated or deactivated. Alternatively, or additionally, first endogenous heat source 302 and/or second endogenous heat source 303 are automatically activated or deactivated, such as, for example, by water generating unit control system 314. Further, in these or other embodiments, when water generating system 300 comprises heat exchanger 304 and comprises first endogenous heat source 302 and/or second endogenous heat source 303, first endogenous heat source 302 and/or second endogenous heat source 303 are used to generate endogenously generated heat when exogenously generated heat received by heat exchanger 304 is unavailable or is insufficient for use to generate water.

In various embodiments, whether water generating unit 301 uses exogenously generated heat received by heat exchanger 304 to supplement or to substitute for endogenously generated heat generated by first endogenous heat source 302 and/or second endogenous heat source 303 to generate water depends on an exogenously generated heat temperature of the exogenously generated heat received by heat exchanger 304 and/or an exogenously generated heat rate of flow of the exogenously generated heat received by heat exchanger 304. For example, in many embodiments, water generating unit 301 can use exogenously generated heat received by heat exchanger 304 instead of endogenously generated heat generated by first endogenous heat source 302 and/or second endogenous heat source 303 to generate water when an exogenously generated heat temperature of the exogenously generated heat exceeds a maximum endogenously generated heat temperature of the endogenously generated heat. In these or other embodiments, water generating unit 301 uses exogenously generated heat received by heat exchanger 304 to supplement endogenously generated heat generated by first endogenous heat source 302 and/or second endogenous heat source 303 to generate water when an exogenously generated heat rate of flow of the exogenously generated heat exceeds a maximum endogenously generated heat rate of flow of the endogenously generated heat. In further embodiments, water generating unit 301 is configured to use exogenously generated heat received by heat exchanger 304 to supplement or to substitute for endogenously generated heat generated by first endogenous heat source 302 and/or second endogenous heat source 303 to generate water when an exogenously generated heat temperature of the exogenously generated heat exceeds a maximum endogenously generated heat temperature of the endogenously generated heat and/or when an exogenously generated heat rate of flow of the exogenously generated heat exceeds a maximum endogenously generated heat rate of flow of the endogenously generated heat. Accordingly, in some embodiments, whether water generating unit 301 can use exogenously generated heat received by heat exchanger 304 to supplement or substitute for endogenously generated heat generated by first endogenous heat source 302 and/or second endogenous heat source 303 to generate water depends on the type of system that exogenous heat source 391 comprises, as explained in greater detail below.

Using exogenously generated heat received by heat exchanger 304 instead of endogenously generated heat generated by first endogenous heat source 302 and/or second endogenous heat source 303 to generate water can be advantageous when it is desirable to use energy that would otherwise be used by first endogenous heat source 302 and/or second endogenous heat source 303 to generate the endogenously generated heat for other purposes and/or when energy to run first endogenous heat source 302 and/or second endogenous heat source 303 is unavailable, such as, for example, when first endogenous heat source 302 comprises a solar thermal heater and sunlight is unavailable and/or when second endogenous heat source 303 comprises an electric heater and electricity is unavailable. Using exogenously generated heat received by heat exchanger 304 instead of endogenously generated heat generated by first endogenous-heat generating-system 302 and/or second endogenous heat source 303 to generate water can be advantageous to reduce wear and tear on first endogenous heat source 302 and/or second endogenous heat source 303.

Using exogenously generated heat received by heat exchanger 304 to supplement endogenously generated heat generated by first endogenous heat source 302 and/or second endogenous heat source 303 to generate water can be advantageous to generate more water than may be possible with endogenously generated heat generated by first endogenous heat source 302 and/or second endogenous heat source 303 alone.

In various embodiments, water generating unit 301 uses exogenously generated heat received by heat exchanger 304 instead of endogenously generated heat generated by first endogenous heat source 302 and/or second endogenous heat source 303 to generate water when an exogenously generated heat temperature of the exogenously generated heat is greater than or equal to about 80 degrees Celsius, 100 degrees Celsius, 180 degrees Celsius, 200 degrees Celsius, or more. In these or other embodiments, water generating unit 301 uses exogenously generated heat received by heat exchanger 304 to supplement endogenously generated heat generated by first endogenous heat source 302 and/or second endogenous heat source 303 to generate water when an exogenously generated heat rate of flow of the exogenously generated heat is greater than or equal to about 1,000 watts, 1,200 watts, 3,000 watts, 3,500 watts, or more.

In various embodiments, heat exchanger 304 comprises any suitable device configured to receive exogenously generated heat from exogenous heat source 391, receive the regeneration fluid(s), and transfer thermal energy from the exogenously generated heat to the regeneration fluid(s). For example, in some embodiments, heat exchanger 304 comprises a solid wall heat exchanger or coil heat exchanger. The type of heat exchanger implemented for heat exchanger 304 can depend on the type of system of exogenous heat source 391, whether the exogenously generated heat of exogenous heat source 391 is supplementing or used instead of endogenously generated heat generated by first endogenous heat source 302 and/or second endogenous heat source 303, and/or a desired size and/or weight of water generating system 300. The terms "heat exchanger" and "exogenous-heat-receiving-heat exchanger" are used interchangeably herein.

Further, when heat exchanger 304 is configured to receive exogenously generated heat generated by exogenous heat source 391, heat exchanger 304 can be in thermal communication with exogenous heat source 391 so that heat exchanger 304 can receive the exogenously generated heat generated by exogenous heat source 391. For example, in some embodiments, heat exchanger 304 is in direct physical contact with exogenous heat source 391. Further, in some of these embodiments, heat exchanger 304 is coupled to exogenous heat source 391.

In various embodiments, the regeneration fluid(s) are received by heat exchanger 304 without regulation. Meanwhile, in other embodiments, the regeneration fluid(s) received by heat exchanger 304 are regulated, such as, for example, by one or more valves. For example, in some embodiments, when one or more valves are implemented to regulate when the regeneration fluid(s) are received by heat exchanger 304, the valve(s) are manually operated. Alternatively or additionally, the valve(s) are automatically operated, such as, for example, by water generating unit control system 314.

As noted above, in various embodiments, at least one of first endogenous heat source 302, second endogenous heat source 303, and heat exchanger 304 are coupled in parallel with at least one other of first endogenous heat source 302, second endogenous heat source 303, and heat exchanger 304. Arranging at least one of first endogenous heat source 302, second endogenous heat source 303, and heat exchanger 304 in parallel with at least one other of first endogenous heat source 302, second endogenous heat source 303, and heat exchanger 304 can be advantageous in situations where only one of the at least one of first endogenous heat source 302, second endogenous heat source 303, and heat exchanger 304 is being used to transfer thermal energy to the regeneration fluid(s). For example, using valves, portions of the conduits routing the regeneration fluid(s) to at least one of first endogenous heat source 302, second endogenous heat source 303, and heat exchanger 304 can be bypassed when the at least one of first endogenous heat source 302, second endogenous heat source 303, or heat exchanger 304 is not in use to reduce losses in thermal energy from the regeneration fluid(s). In some embodiments, the valves are manually operated. Alternatively or additionally, the valves are automatically operated, such as, for example, by water generating unit control system 314.

In various embodiments, reservoir 315 stores water extracted from the regeneration fluid(s) by condenser 306. Accordingly, reservoir 315 can comprise any suitable receptacle or container configured to store water. Further, reservoir 315 can be coupled to condenser 306 to receive the water extracted from the regeneration fluid(s) by condenser 306. For example, reservoir 315 can be coupled to condenser 306 by any suitable conduits configured to transfer the water extracted from the regeneration fluid(s) by condenser 306 to reservoir 315.

In various embodiments, first filter 316 is configured to filter water output by condenser 306, such as, for example, to remove one or more materials (e.g., one or more materials toxic to humans, pets, and/or other animals) from the water. Accordingly, first filter 316 can be coupled to an output of condenser 306, such as, for example, between condenser 306 and reservoir 315. First filter 316 can comprise any suitable device configured to filter water. For example, first filter 316 can comprise a carbon filter and/or a stainless steel frit.

In various embodiments, second filter 317 is configured to filter water output by reservoir 315, such as, for example, to remove one or more materials (e.g., one or more materials toxic to humans) from the water. Accordingly, second filter 317 can be coupled to an output of reservoir 315. Second filter 317 can comprise any suitable device configured to filter water. For example, second filter 317 can comprise a carbon filter and/or a stainless steel frit. In some embodiments, second filter 317 can be omitted, such as, for example, when reservoir 315 is omitted.

In various embodiments, condenser heat exchanger 313 is configured to transfer thermal energy from the regeneration fluid(s) upstream of condenser 306 to the regeneration fluid(s) downstream of condenser 306. For example, removing thermal energy from the regeneration fluid(s) upstream of condenser 306 can help prime or pre-cool the water vapor in the regeneration fluid(s) to be condensed into liquid water at condenser 306 by reducing the regeneration fluid(s) to nearer to a temperature at which the water vapor will condense into liquid water. Meanwhile, the thermal energy extracted from the regeneration fluid(s) by condenser heat exchanger 313 can be transferred to the regeneration fluid(s) downstream of condenser 306 so that the thermal energy can heat the regeneration fluid(s) upstream of desiccation device 305. As a result, implementing condenser heat exchanger 313 can make water generating system 300 more efficient by making use of thermal energy in the regeneration fluid(s)

that would otherwise be lost to condenser 306 to heat the regeneration fluid(s) heading to desiccation device 305.

In various embodiments, exogenous heat source 391 comprises any suitable system configured to generate exogenously generated heat. Further, in some embodiments, exogenous heat source 391 comprises a system configured to generate exogenously generated heat having an exogenously generated heat temperature exceeding a maximum endogenously generated heat temperature of endogenously generated heat generated by first endogenous heat source 302 and/or second endogenous heat source 303, and/or having an exogenously generated heat rate of flow exceeding a maximum endogenously generated heat rate of flow of endogenously generated heat generated by first endogenous heat source 302 and/or second endogenous heat source 303.

In various embodiments, exogenous heat source 391 is a stand-alone system that operates separately and/or independently from water generating unit 301. In these or other embodiments, exogenous heat source 391 is useful without being used with water generating unit 301. The terms "exogenous heat source" and "exogenous-heat-generating-system" are used interchangeably herein.

In various embodiments, the exogenously generated heat generated by exogenous heat source 391 comprises waste heat of exogenous heat source 391. Waste heat of exogenous heat source 391 refers to heat generated by exogenous heat source 391 (when exogenous heat source 391 operates) that is unused by exogenous heat source 391. For example, in many embodiments, the waste heat of exogenous heat source 391 results as a by-product of the operation of exogenous heat source 391. In these or other embodiments, the waste heat of exogenous heat source 391 is heat that would be released to the atmosphere around (e.g., adjacent to) exogenous heat source 391 if unused by water generating unit 301 to generate water. Accordingly, water generating system 300 advantageously can make use of waste heat of exogenous heat source 391 to generate water rather than have the waste heat be wasted or otherwise go unused.

In various embodiments, exogenous heat source 391 comprises a heating fire (e.g., a campfire, a gas heater and/or stove, etc.), a heating element, an electric generator, a fuel cell, a heat engine (e.g., an internal combustion engine), multiple computer servers (e.g., a server farm), or a refrigeration system (e.g., an air conditioner, a refrigerator, etc.). For example, in some embodiments, a gas heater and/or stove comprises a butane gas heater and/or stove. In some embodiments, a heating fire comprises a cooking fire, such as, for example, when a heating fire is being used to cook food. Further, a heating element comprises a cooking element, such as, for example, when a heating element is being used to cook food. In some embodiments, exogenous heat source 391 is a system other than a system configured to generate water for a user of water generating unit 301.

In various embodiments, the type of system that exogenous heat source 391 comprises determines how heat exchanger 304 thermally communicates with exogenous heat source 391 to receive exogenously generated heat generated by exogenous-heat generating-system 391. For example, in some embodiments, when exogenous heat source 391 comprises a heat engine, heat exchanger 304 is mounted to an exhaust device of the heat engine. In other embodiments, when exogenous heat source 391 comprises a campfire, heat exchanger 304 is placed in or proximal to the campfire.

As indicated above, the type of system that exogenous heat source 391 comprises can determine whether water generating unit 301 can use exogenously generated heat received by heat exchanger 304 to supplement or substitute for the endogenously generated heat generated by first endogenous heat source 302 and/or second endogenous heat source 303 to generate water. In various embodiments, when exogenous heat source 391 comprises a heating fire and/or a cooking fire (e.g., a campfire), water generating unit 301 uses exogenously generated heat received by heat exchanger 304 to supplement or substitute for the endogenously generated heat generated by first endogenous heat source 302 and/or second endogenous heat source 303 to generate water, such as, for example, because exogenously generated heat from a heating fire and/or a cooking fire (e.g., a campfire) may have an exogenously generated heat temperature (e.g., approximately 500 degrees Celsius) and an exogenously generated heat rate of flow (e.g., approximately 500 watts-2000 watts) exceeding a maximum endogenously generated heat temperature and a maximum endogenously generated heat rate of flow of the endogenously generated heat of first endogenous heat source 302 and/or second endogenous heat source 303. In these or other embodiments, when exogenous heat source 391 comprises an electric generator, water generating unit 301 uses exogenously generated heat received by heat exchanger 304 instead of the endogenously generated heat generated by first endogenous heat source 302 and/or second endogenous heat source 303 to generate water, such as, for example, because exogenously generated heat from an electric generator may have an exogenously generated heat temperature (e.g., approximately 100 degrees Celsius) exceeding a maximum endogenously generated heat temperature of the endogenously generated heat generated by first endogenous heat source 302 and/or second endogenous heat source 303, but an exogenously generated heat rate of flow (e.g., approximately 800 watts) below a maximum endogenously generated heat rate of flow of the endogenously generated heat generated by first endogenous heat source 302 and/or second endogenous heat source 303. In these or other embodiments, when exogenous heat source 391 comprises a refrigeration system, water generating unit 301 uses exogenously generated heat received by heat exchanger 304 to supplement the endogenously generated heat generated by first endogenous heat source 302 and/or second endogenous heat source 303 to generate water, such as, for example, because exogenously generated heat from a refrigeration system may have an exogenously generated heat rate of flow (e.g., approximately 300 watts-1500 watts) exceeding a maximum endogenously generated heat rate of flow of the endogenously generated heat of first endogenous heat source 302 and/or second endogenous heat source 303, but an exogenously generated heat temperature (e.g., approximately 60 degrees Celsius) below maximum endogenously generated heat temperature of the endogenously generated heat generated by first endogenous heat source 302 and/or second endogenous heat source 303.

Further, in various embodiments, the type of system that exogenous heat source 391 comprises determines a size and weight of water generating unit 301. For example, as an exogenously generated heat temperature and/or an exogenously generated heat rate of flow of the exogenously generated heat generated by exogenous heat source 391 increases, a size of water generating unit 301 can be reduced, thereby increasing a portability of water generating unit 301. In particular, as an exogenously generated heat temperature and/or an exogenously generated heat rate of flow of the exogenously generated heat generated by exogenous heat source 391 increases, water generating unit 301 can generate more water for a constant volume of the process fluid(s)

and/or a constant surface area of desiccant element 311 up to the physical limits of the process fluid(s) and/or desiccant element 311. In many embodiments, the type of system implemented for exogenous heat source 391 is selected such that water generating unit 301 comprises a weight less than or equal to approximately 45 kilograms (100 pounds) or approximately 36 kilograms (80 pounds).

In various embodiments, exogenous electricity source 392 comprises any suitable system configured to generate exogenously generated electricity. For example, in many embodiments, exogenous electricity source 392 comprises a photovoltaic electric system comprising one or more solar panels, and the solar panel(s) comprises one or more photovoltaic cells configured to generate the exogenously generated electricity. For example, the photovoltaic cell(s) can be configured to convert solar insolation into the exogenously generated electricity. In other embodiments, exogenous electricity source 392 comprises a wind electric system, a tidal electric system, a wave electric system, a hydroelectric system, etc. In further embodiments, exogenous electricity source 392 comprises a system configured to generate exogenously generated electricity that is operated by a private party and not by a public utility. In these or other embodiments, exogenous electricity source 392 comprises a system configured to generate exogenously generated electricity that also is configured so that exogenously generated electricity generated by exogenous electricity source 392 can be sold to a public utility and provided to an electric grid of the public utility. In some embodiments, exogenous electricity source 392 can be a system other than a system configured to generate water for a user of water generating unit 301. The terms "exogenous electricity source" and "exogenous-electricity-generating-system" are used interchangeably herein.

In various embodiments, exogenous electricity source 392 is a stand-alone system that operates separately and/or independently from water generating unit 301. In these or other embodiments, exogenous electricity source 392 is useful without being used with water generating unit 301.

In various embodiments, exhaust process fluid source 393 comprises any suitable system configured to generate an exhaust process fluid. For example, in many embodiments, exhaust process fluid source 393 comprises a steam generator or a system implementing a steam generator, a bioreactor, etc. In some embodiments, exhaust process fluid source 393 is a system other than a system configured to generate water for a user of water generating unit 301. The terms "exhaust process fluid source" and "exhaust-process-fluid-generating-system" are used interchangeably herein.

In various embodiments, exhaust process fluid source 393 is a stand-alone system that operates separately and/or independently from water generating unit 301. In these or other embodiments, exhaust process fluid source 393 is useful without being used with water generating unit 301.

In various embodiments, water generating unit control system 314 is configured to control one or more parts of water generating unit 301. For example, in many embodiments, water generating unit control system 314 controls operation of blower 307, circulator 308 and/or actuator 312. Further, in some embodiments, water generating unit control system 314 controls operation of condenser 306, such as, for example, when condenser 306 is implemented as an active device.

For example, in various embodiments, water generating unit control system 314 controls (e.g., increases or decreases) a speed at which blower 307 moves (e.g., pumps) the process fluid(s). Further, in these or other embodiments, water generating unit control system 314 controls (e.g., increases or decreases) a speed at which circulator 308 moves (e.g., pumps) the regeneration fluid(s). Further still, in these or other embodiments, water generating unit control system 314 controls (e.g., increases or decreases) a speed at which actuator 312 moves (e.g., rotates) desiccant element 311.

In various embodiments, water generating unit control system 314 employs a control algorithm to control blower 307, circulator 308 and/or actuator 312, such as, for example, in a manner that maximizes the water generated by water generating unit 301 and/or minimizes electricity used by water generating unit 301 to generate water.

In various embodiments, the control algorithm determines (e.g., solves) optimal control conditions for blower 307, circulator 308 and/or actuator 312 as a function of (i) an ambient air temperature at water generating unit 301, (ii) an ambient air relative humidity at water generating unit 301, (iii) a temperature of the exhaust process fluid, (iv) a relative humidity of the exhaust process fluid, (v) an endogenously generated heat temperature of the endogenously generated heat generated by first endogenous heat source 302, (vi) an endogenously generated heat rate of flow of the endogenously generated heat generated by first endogenous heat source 302, (vii) an endogenously generated heat temperature of the endogenously generated heat generated by second endogenous heat source 303, (viii) an endogenously generated heat rate of flow of the endogenously generated heat generated by second endogenous heat source 303, (ix) an exogenously generated heat temperature of the exogenously generated heat received by heat exchanger 304, and/or (x) an exogenously generated heat rate of flow of the exogenously generated heat received by heat exchanger 304. For example, in some embodiments, the control algorithm controlling blower 307, circulator 308 and/or actuator 312 evaluates the ambient air temperature at water generating unit 301 and/or the ambient air relative humidity at water generating unit 301 when water generating unit 301 is configured to receive the atmospheric process fluid. Further, in some embodiments, the control algorithm controlling blower 307, circulator 308 and/or actuator 312 evaluates the temperature of the exhaust process fluid and/or the relative humidity of the exhaust process fluid when water generating unit 301 is configured to receive the exhaust process fluid. Further, in some embodiments, the control algorithm controlling blower 307, circulator 308 and/or actuator 312 evaluates the endogenously generated heat temperature of the endogenously generated heat generated by first endogenous heat source 302 and/or the endogenously generated heat rate of flow of the endogenously generated heat generated by first endogenous heat source 302 when water generating unit 301 comprises first endogenous heat source 302. Further, in some embodiments, the control algorithm controlling blower 307, circulator 308 and/or actuator 312 evaluates the endogenously generated heat temperature of the endogenously generated heat generated by second endogenous heat source 303 and/or the endogenously generated heat rate of flow of the endogenously generated heat generated by second endogenous heat source 303 when water generating unit 301 comprises second endogenous heat source 303. Further, in some embodiments, the control algorithm controlling blower 307, circulator 308 and/or actuator 312 evaluates the exogenously generated heat temperature of the exogenously generated heat received by heat exchanger 304 and/or the exogenously generated heat rate of flow of the exogenously generated heat received by heat exchanger 304 when water generating unit 301 comprises heat exchanger 304. Further, in many embodiments, the control algorithm controlling blower 307, circulator 308 and/or actuator 312 determines (e.g., solves) optimal control conditions for blower 307, circulator 308 and/or actuator 312 relative to each other.

In various embodiments, water generating unit control system 314 communicates with one or more sensors (e.g., one or more temperature sensors) configured to detect (e.g., detect in real-time) the ambient air temperature at water generating unit 301 in order to determine the ambient air temperature at water generating unit 301.

In various embodiments, water generating unit control system 314 communicates with one or more sensors (e.g., one or more humidity sensors) configured to detect (e.g., detect in real-time) the ambient air relative humidity at water generating unit 301 in order to determine the ambient air relative humidity at water generating unit 301.

In various embodiments, water generating unit control system 314 communicates with one or more sensors (e.g., one or more temperature sensors) configured to detect (e.g., detect in real-time) the temperature of the exhaust process fluid in order to determine the temperature of the exhaust process fluid.

In various embodiments, water generating unit control system 314 communicates with one or more sensors (e.g., one or more humidity sensors) configured to detect (e.g., detect in real-time) the relative humidity of the exhaust process fluid in order to determine the relative humidity of the exhaust process fluid.

In various embodiments, water generating unit control system 314 communicates with one or more sensors (e.g., one or more temperature sensors) configured to detect (e.g., detect in real-time) the endogenously generated heat temperature of the endogenously generated heat generated by first endogenous heat source 302 in order to determine the endogenously generated heat temperature of the endogenously generated heat generated by first endogenous heat source 302.

In various embodiments, water generating unit control system 314 communicates with one or more sensors (e.g., one or more heat rate of flow sensors) configured to detect (e.g., detect in real-time) the endogenously generated heat rate of flow of the endogenously generated heat generated by first endogenous heat source 302 in order to determine the endogenously generated heat rate of flow of the endogenously generated heat generated by first endogenous heat source 302. In other embodiments, water generating unit control system 314 communicates with one or more mass flow rate sensors configured to detect (e.g., detect in real-time) a mass flow rate of the endogenously generated heat and one or more temperature sensors configured to detect (e.g., detect in real-time) a temperature of the endogenously generated heat, which information can be used to determine (e.g., determine in real-time) the heat rate of flow of the endogenously generated heat.

In various embodiments, water generating unit control system 314 communicates with one or more sensors (e.g., one or more temperature sensors) configured to detect (e.g., detect in real-time) the endogenously generated heat temperature of the endogenously generated heat generated by second endogenous heat source 303 in order to determine the endogenously generated heat temperature of the endogenously generated heat generated by second endogenous heat source 303.

In various embodiments, water generating unit control system 314 communicates with one or more sensors (e.g., one or more heat rate of flow sensors) configured to detect (e.g., detect in real-time) the endogenously generated heat rate of flow of the endogenously generated heat generated by second endogenous heat source 303 in order to determine the endogenously generated heat rate of flow of the endogenously generated heat generated by second endogenous heat source 303. In other embodiments, water generating unit control system 314 communicates with one or more mass flow rate sensors configured to detect (e.g., detect in real-time) a mass flow rate of the endogenously generated heat and one or more temperature sensors configured to detect (e.g., detect in real-time) a temperature of the endogenously generated heat, which information can be used to determine (e.g., determine in real-time) the heat rate of flow of the endogenously generated heat.

In various embodiments, water generating unit control system 314 communicates with one or more sensors (e.g., one or more temperature sensors) configured to detect (e.g., detect in real-time) the exogenously generated heat temperature of the exogenously generated heat received by heat exchanger 304 in order to determine the exogenously generated heat temperature of the exogenously generated heat received by heat exchanger 304.

In various embodiments, water generating unit control system 314 communicates with one or more sensors (e.g., one or more heat rate of flow sensors) configured to detect (e.g., detect in real-time) the exogenously generated heat rate of flow of the exogenously generated heat received by heat exchanger 304 in order to determine the exogenously generated heat rate of flow of the exogenously generated heat received by heat exchanger 304. In other embodiments, water generating unit control system 314 communicates with one or more mass flow rate sensors configured to detect (e.g., detect in real-time) a mass flow rate of the exogenously generated heat and one or more temperature sensors configured to detect (e.g., detect in real-time) a temperature of the exogenously generated heat, which information can be used to determine (e.g., determine in real-time) the heat rate of flow of the exogenously generated heat.

For example, in various embodiments, water generating unit control system 314 decreases the speed of actuator 312 as (a) the ambient air temperature at water generating unit 301 increases, (b) the ambient air relative humidity at water generating unit 301 increases, (c) the temperature of the exhaust process fluid increases, and/or (iv) the relative humidity of the exhaust process fluid increases. In various embodiments, water generating unit control system 314 decreases the speed of actuator 312 as (i) the endogenously generated heat temperature of the endogenously generated heat generated by first endogenous heat source 302 decreases, (ii) the endogenously generated heat rate of flow of the endogenously generated heat generated by first endogenous heat source 302 decreases, (iii) the endogenously generated heat temperature of the endogenously generated heat generated by second endogenous heat source 303 decreases, (iv) the endogenously generated heat rate of flow of the endogenously generated heat generated by second endogenous heat source 303 decreases, (v) the exogenously generated heat temperature of the exogenously generated heat received by heat exchanger 304 decreases, and/or (vi) the exogenously generated heat rate of flow of the exogenously generated heat received by heat exchanger 304 decreases. In these or other embodiments, water generating unit control system 314 can increase the speed of actuator 312 as (a) the ambient air temperature at water generating unit 301 decreases, (b) the ambient air relative humidity at water generating unit 301 decreases, (c) the temperature of the exhaust process fluid decreases, and/or (d) the relative humidity of the exhaust process fluid decreases. In these or other embodiments, water generating unit control system 314 can increase the speed of actuator 312 as (i) the endogenously generated heat temperature of the endogenously generated heat generated by first endogenous heat source 302 increases, (ii) the endogenously generated heat rate of flow of the endogenously generated heat generated by first endogenous heat source 302 increases, (iii) the endogenously generated heat temperature of the endogenously generated heat generated by second endogenous heat source 303 increases, (iv) the endogenously generated heat rate of flow of the endogenously generated heat generated by second endogenous heat source 303 increases, (v) the exogenously generated heat temperature of the exogenously generated heat received by heat exchanger 304 increases, and/or (vi) the exogenously generated heat rate of flow of the exogenously generated heat received by heat exchanger 304 increases.

In various embodiments, water generating unit control system 314 increases the speed of blower 307 and/or circulator 308 as (a) the ambient air temperature at water generating unit 301 increases, (b) the ambient air relative humidity at water generating unit 301 increases, (c) the temperature of the exhaust process fluid increases, and/or (d) the relative humidity of the exhaust process fluid increases. In various embodiments, water generating unit control system 314 increases the speed of blower 307 and/or circulator 308 as (i) the endogenously generated heat temperature of the endogenously generated heat generated by first endogenous heat source 302 decreases, (ii) the endogenously generated heat rate of flow of the endogenously generated heat generated by first endogenous heat source 302 decreases, (iii) the endogenously generated heat temperature of the endogenously generated heat generated by second endogenous heat source 303 decreases, (iv) the endogenously generated heat rate of flow of the endogenously generated heat generated by second endogenous heat source 303 decreases, (v) the exogenously generated heat temperature of the exogenously generated heat received by heat exchanger 304 decreases, and/or (vi) the exogenously generated heat rate of flow of the exogenously generated heat received by heat exchanger 304 decreases. In these or other embodiments, water generating unit control system 314 decreases the speed of circulator 308 as (a) the ambient air temperature at water generating unit 301 decreases, (b) the ambient air relative humidity at water generating unit 301 decreases, (c) the temperature of the exhaust process fluid decreases, and/or (d) the relative humidity of the exhaust process fluid decreases. In these or other embodiments, water generating unit control system 314 decreases the speed of circulator 308 as (i) the endogenously generated heat temperature of the endogenously generated heat generated by first endogenous heat source 302 increases, (ii) the endogenously generated heat rate of flow of the endogenously generated heat generated by first endogenous heat source 302 increases, (iii) the endogenously generated heat temperature of the endogenously generated heat generated by second endogenous heat source 303 increases, (iv) the endogenously generated heat rate of flow of the endogenously generated heat generated by second endogenous heat source 303 increases, (v) the exogenously generated heat temperature of the exogenously generated heat received by heat exchanger 304 increases, and/or (vi) the exogenously generated heat rate of flow of the exogenously generated heat received by heat exchanger 304 increases.

In various embodiments, water generating unit control system 314 controls when water generating unit 301 uses the exhaust process fluid generated by exhaust process fluid source 393 to generate water. For example, in these or other embodiments, water generating unit control system 314 selectively opens or closes one or more valves of the conduit(s) coupling blower 307 to exhaust process fluid source 393 to control when water generating unit 301 uses exhaust process fluid generated by exogenous electricity source 392 to generate water. By opening the valve(s) of the conduit(s) coupling blower 307 to exhaust process fluid source 393, water generating unit control system 314 can make available the exhaust process fluid to blower 307 so that water generating unit 301 can use the exhaust process fluid to generate water.

As used herein, opening valve(s) and/or causing valve(s) to comprise an open position should be understood to allow and/or facilitate communication of fluid from one portion of a water generating system to other portions of the water generating system; closing valve(s) and/or causing valve(s) to comprise a closed position should be understood to prevent and/or decrease communication of fluid from one portion of a water generating system to another portion of the water generating system. In various embodiments, valve(s) may be partially opened and/or closed to increase and/or decrease, respectively, a relative rate of fluid communication within the water generating system. As used herein, reference to opening and/or closing valve(s) should be understood to include partially opening and/or closing valve(s).

In various embodiments, water generating unit control system 314 employs a control algorithm to control (e.g., open or close) the valve(s) of the conduit(s) coupling blower 307 to exhaust process fluid source 393, such as, for example, in a manner that maximizes the water generated by water generating unit 301 and/or minimizes electricity used by water generating unit 301 to generate water. By employing the control algorithm, water generating unit control system 314 can evaluate whether the exhaust process fluid is used by water generating unit 301 to generate water.

For example, the control algorithm can determine (e.g., solve) optimal control conditions for the valve(s) of the conduit(s) coupling blower 307 to exhaust process fluid source 393 as a function of (i) a back pressure acting on the exhaust process fluid, (ii) a flow rate of the exhaust process fluid, (iii) a relative humidity of the atmospheric process fluid (i.e., an ambient air relative humidity at water generating unit 301), (iv) a relative humidity of the exhaust process fluid, and/or (v) a chemistry of the exhaust process fluid. In some embodiments, the control algorithm to control (e.g., open or close) the valve(s) of the conduit(s) coupling blower 307 to exhaust process fluid source 393 can be part of the control algorithm that controls blower 307, circulator 308 and/or actuator 312, and vice versa.

In various embodiments, water generating unit control system 314 communicates with one or more sensors (e.g., one or more pressure sensors) configured to detect (e.g., detect in real-time) the back pressure acting on the exhaust pressure fluid in order to determine the back pressure acting on the exhaust pressure fluid.

In various embodiments, water generating unit control system 314 communicates with one or more sensors (e.g., one or more fluid flow rate sensors) configured to detect (e.g., detect in real-time) the flow rate of the exhaust process fluid in order to determine the flow rate of the exhaust process fluid.

In various embodiments, water generating unit control system 314 communicates with one or more sensors (e.g., one or more humidity sensors) configured to detect (e.g., detect in real-time) the relative humidity of the atmospheric process fluid in order to determine the relative humidity of the atmospheric process fluid.

In various embodiments, water generating unit control system 314 communicates with one or more sensors (e.g., one or more humidity sensors) configured to detect (e.g., detect in real-time) the relative humidity of the exhaust process fluid in order to determine the relative humidity of the exhaust process fluid.

In various embodiments, water generating unit control system 314 communicates with one or more sensors (e.g., one or more particle sensors, one or more gas sensors, etc.) configured to detect (e.g., detect in real-time) the chemistry of the exhaust process fluid in order to determine the chemistry of the exhaust process fluid.

In various embodiments, water generating unit control system 314 opens the valve(s) of the conduit(s) coupling blower 307 to exhaust process fluid source 393 when a relative humidity of the exhaust process fluid exceeds a relative humidity of the atmospheric process fluid (i.e., an ambient air relative humidity at water generating unit 301), and closes the valve(s) of the conduit(s) coupling blower 307 to exhaust process fluid source 393 when a relative humidity of the atmospheric process fluid (i.e., an ambient air relative humidity at water generating unit 301) exceeds a relative humidity of the exhaust process fluid.

In various embodiments, water generating unit control system 314 opens the valve(s) of the conduit(s) coupling blower 307 to exhaust process fluid source 393 when the back pressure acting on the exhaust pressure fluid is less than a predetermined pressure, and closes the valve(s) of the conduit(s) coupling blower 307 to exhaust process fluid source 393 when the back pressure acting on the exhaust pressure fluid is greater than or equal to the predetermined pressure. For example, the predetermined back pressure can be selected as a pressure at which the electricity used by blower 307 exceeds a predetermined amount of electric power, and/or a pressure having a force equal to a maximum force that blower 307 can apply to the process fluid(s).

In various embodiments, water generating unit control system 314 opens the valve(s) of the conduit(s) coupling blower 307 to exhaust process fluid source 393 when the flow rate of the exhaust process fluid is greater than a predetermined flow rate. For example, the predetermined flow rate can be selected as a maximum flow rate at which blower 307 can move (e.g., pump) the atmospheric process fluid and/or the exhaust process fluid.

In various embodiments, water generating unit control system 314 closes the valve(s) of the conduit(s) coupling blower 307 to exhaust process fluid source 393 when a presence and/or a quantity of one or more materials toxic to humans, pets, and/or other animals in the exhaust process fluid is detected by the sensor(s) (e.g., e.g., one or more particle sensors, one or more gas sensors, etc.) configured to detect (e.g., detect in real-time) the chemistry of the exhaust process fluid.

In various embodiments, as noted above, water generating unit control system 314 controls when water generating unit 301 uses (a) endogenously generated heat generated by first endogenous heat source 302 to generate water, (b) endogenously generated heat generated by second endogenous heat source 303 to generate water, and/or (c) exogenously generated heat received by heat exchanger 304 to generate water.

In various embodiments, water generating unit control system 314 controls when water generating unit 301 uses exogenously generated electricity generated by exogenous electricity source 392 to generate water in order to control when water generating unit control system 314 uses endogenously generated heat generated by second endogenous heat source 303 to generate water. As used herein, closing electrical switch(es) and/or causing electrical switch(es) to comprise an closed position should be understood to allow and/or facilitate communication of electrical current through an electrical line of a water generating system so as to energize one or more portions of the water generating system; opening electrical switch(es) and/or causing electrical switch(es) to comprise an open position should be understood to prevent communication of electrical current through an electrical line of a water generating system so as to de-energize one or more portions of the water generating system.

For example, water generating unit control system 314 can selectively close or open one or more electrical switches to energize or de-energize, respectively, an electrical line configured to electrically couple exogenous electricity source 392 to second endogenous heat source 303 to control when water generating unit 301 uses exogenously generated electricity generated by exogenous electricity source 392 to generate water. By closing the electrical switch(es) of the electrical line configured to electrically couple exogenous electricity source 392 to second endogenous heat source 303, water generating unit control system 314 can make available the exogenous electricity generated by exogenous electricity source 392 to second endogenous heat source 303. In turn, second endogenous heat source 303 can use the exogenous electricity generated by exogenous electricity source 392 to generate the endogenously generated heat generated by second endogenous heat source 303 and make available the endogenously generated heat generated by second endogenous heat source 303 to the regeneration fluid(s) of water generating unit 301 so that water generating unit 301 can use the endogenously generated heat generated by second endogenous heat source 303 to generate water. In further embodiments, water generating unit control system 314 also controls a quantity of the exogenously generated electricity generated by exogenous electricity source 392 that second endogenous heat source 303 uses to generate water. For example, water generating unit control system 314 can limit the quantity of the exogenously generated electricity generated by exogenous electricity source 392 that second endogenous heat source 303 draws from exogenous electricity source 392 so that the quantity does not exceed a percentage of a total quantity of exogenously generated electricity generated by exogenous electricity source 392.

In various embodiments, water generating unit control system 314 selectively opens or closes one or more valves of the conduit(s) configured to make available the regeneration fluid(s) to first endogenous heat source 302 to control when water generating unit 301 uses endogenously generated heat generated by first endogenous heat source 302 to generate water. By opening the valve(s) of the conduit(s) configured to make available the regeneration fluid(s) to first endogenous heat source 302, water generating unit control system 314 can make available the endogenously generated heat generated by first endogenous heat source 302 to the regeneration fluid(s) so that water generating unit 301 can use the endogenously generated heat generated by first endogenous heat source 302 to generate water.

In various embodiments, water generating unit control system 314 selectively opens or closes one or more valves of the conduit(s) configured to make available the regeneration fluid(s) to second endogenous heat source 303 to control when water generating unit 301 uses endogenously generated heat generated by second endogenous heat source 303 to generate water. By opening the valve(s) of the conduit(s) configured to make available the regeneration fluid(s) to second endogenous heat source 303, water generating unit control system 314 can make available the endogenously generated heat generated by second endogenous heat source 303 to the regeneration fluid(s) so that water generating unit 301 can use the endogenously generated heat generated by second endogenous heat source 303 to generate water.

In various embodiments, water generating unit control system 314 selectively opens or closes one or more valves of the conduit(s) configured to make available the regeneration fluid(s) to heat exchanger 304 to control when water generating unit 301 uses exogenously generated heat received by heat exchanger 304 to generate water. By opening the valve(s) of the conduit(s) configured to make available the regeneration fluid(s) to heat exchanger 304, water generating unit control system 314 can make available the exogenously generated heat received by heat exchanger 304 to the regeneration fluid(s) so that water generating unit 301 can use the exogenously generated heat received by heat exchanger 304 to generate water.

In various embodiments, water generating unit control system 314 employs a control algorithm to (a) control (e.g., close or open) the electrical switch(es) of the electrical line configured to electrically couple exogenous electricity source 392 to second endogenous heat source 303, (b) control (e.g., open or close) the valve(s) of the conduit(s) configured to make available the regeneration fluid(s) to first endogenous heat source 302, (c) control (e.g., open or close) the valve(s) of the conduit(s) configured to make available the regeneration fluid(s) to second endogenous heat source 303, and/or (d) control (e.g., open or close) the valve(s) of the conduit(s) configured to make available the regeneration fluid(s) to heat exchanger 304, such as, for example, in a manner that maximizes the water generated by water generating unit 301 and/or minimizes electricity used by water generating unit 301 to generate water. By employing the control algorithm, water generating unit control system 314 can evaluate whether (i) the endogenously generated heat generated by first endogenous heat source 302 can be used to increase the yield of generated water, (ii) the endogenously generated heat generated by second endogenous heat source 303 (e.g., the exogenous electricity generated by exogenous electricity source 392) can be used to increase the yield of generated water, and/or (iii) the exogenously generated heat received by heat exchanger 304 can be used to increase the yield of generated water.

For example, the control algorithm can determine (e.g., solve) optimal control conditions for (a) the electrical switch(es) of the electrical line configured to electrically couple exogenous electricity source 392 to second endogenous heat source 303, (b) the valve(s) of the conduit(s) configured to make available the regeneration fluid(s) to first endogenous heat source 302, (c) the valve(s) of the conduit(s) configured to make available the regeneration fluid(s) to second endogenous heat source 303, and/or (d) the valve(s) of the conduit(s) configured to make available the regeneration fluid(s) to heat exchanger 304. In various embodiments, such optimal control conditions can be determined as a function of (i) an ambient air temperature at water generating unit 301, (ii) an ambient air relative humidity at water generating unit 301, (iii) a temperature of the exhaust process fluid, (iv) a relative humidity of the exhaust process fluid, (v) an endogenously generated heat temperature of the endogenously generated heat generated by first endogenous heat source 302, (vi) an endogenously generated heat rate of flow of the endogenously generated heat generated by first endogenous heat source 302, (vii) an endogenously generated heat temperature of the endogenously generated heat generated by second endogenous heat source 303, (viii) an endogenously generated heat rate of flow of the endogenously generated heat generated by second endogenous heat source 303, (ix) an exogenously generated heat temperature of the exogenously generated heat received by heat exchanger 304, (x) an exogenously generated heat rate of flow of the exogenously generated heat received by heat exchanger 304, (xi) a buy back rate of the exogenously generated electricity generated by exogenous electricity source 392, (xii) a temperature of an inverter of exogenous-electricity generating-system 392, (xiii) an available electric power of the exogenously generated electricity generated by exogenous electricity source 392, (xiv) a potential available electric power of the exogenously generated electricity generated by exogenous electricity source 392, (xv) an available quantity of stored water stored by water generating unit 301, (xvi) a water use pattern of the user of water generating unit 301, (xvii) a forecast of weather at water generating unit 301, (xvii) a date, (xix) a clock time, (xx) a location of water generating unit 301, and/or (xxi) at least one alternative use for the exogenously generated heat received by heat exchanger 304.

As used herein, the buy back rate of the exogenously generated electricity generated by exogenous electricity source 392 can refer to a market price per unit at which the exogenously generated electricity generated by exogenous electricity source 392 can be sold to a third party (e.g., a public utility). Further, as used herein, an inverter of exogenous electricity source 392 can refer to a power inverter that exogenous electricity source 392 can use to convert exogenously generated electricity generated by exogenous electricity source 392 from direct current to alternating current, such as, for example, so that the exogenously generated electricity generated by exogenous electricity source 392 can be sold to a third party (e.g., a public utility). Further, as used herein, the available electric power of the exogenously generated electricity generated by exogenous electricity source 392 can refer to an electric power of the exogenously generated electricity generated by exogenous electricity source 392 that is currently available, and the potential available electric power of the exogenously generated electricity generated by exogenous electricity source 392 can refer to an electric power of the exogenously generated electricity generated by exogenous electricity source 392 that could be made available by increasing production (e.g., a maximum electric power of exogenously generated electricity generated by exogenous electricity source 392 that can be produced).

For example, the potential available electric power of the exogenously generated electricity generated by exogenous electricity source 392 can depend on a system architecture of exogenous electricity source 392. Further, as used herein, the available quantity of water stored by water generating unit 301 can refer to a quantity of water held in reserve by water generating unit 301, such as, for example, at reservoir 315. Further, as used herein, the water use pattern of the user of water generating unit 301 can refer to a pattern of water use by the user of water generating unit 301 broken up into increments of time (e.g., hours, days, weeks, etc.).

In these or other embodiments, the control algorithm controlling (a) the electrical switch(es) of the electrical line configured to electrically couple exogenous electricity source 392 to second endogenous heat source 303, (b) the valve(s) of the conduit(s) configured to make available the regeneration fluid(s) to first endogenous heat source 302, (c) the valve(s) of the conduit(s) configured to make available the regeneration fluid(s) to second endogenous heat source 303, and/or (d) the valve(s) of the conduit(s) configured to make available the regeneration fluid(s) to heat exchanger 304, can determine (e.g., solve) optimal control conditions for (i) the electrical switch(es) of the electrical line configured to electrically couple exogenous electricity source 392 to second endogenous heat source 303, (ii) the valve(s) of the conduit(s) configured to make available the regeneration fluid(s) to first endogenous heat source 302, (iii) the valve(s) of the conduit(s) configured to make available the regeneration fluid(s) to second endogenous heat source 303, and/or (iv) the valve(s) of the conduit(s) configured to make available the regeneration fluid(s) to heat exchanger 304 relative to each other.

In some embodiments, the control algorithm controlling (a) the electrical switch(es) of the electrical line configured to electrically couple exogenous electricity source 392 to second endogenous heat source 303, (b) the valve(s) of the conduit(s) configured to make available the regeneration fluid(s) to first endogenous heat source 302, (c) the valve(s) of the conduit(s) configured to make available the regeneration fluid(s) to second endogenous heat source 303, and/or (d) the valve(s) of the conduit(s) configured to make available the regeneration fluid(s) to heat exchanger 304, can be part of (i) the control algorithm that controls the valve(s) of the conduit(s) coupling blower 307 to exhaust process fluid source 393 and/or (ii) the control algorithm that controls blower 307, circulator 308 and/or actuator 312, and vice versa.

For example, in various embodiments, the control algorithm controlling (a) the electrical switch(es) of the electrical line configured to electrically couple exogenous electricity source 392 to second endogenous heat source 303, (b) the valve(s) of the conduit(s) configured to make available the regeneration fluid(s) to first endogenous heat source 302, (c) the valve(s) of the conduit(s) configured to make available the regeneration fluid(s) to second endogenous heat source 303, and/or (d) the valve(s) of the conduit(s) configured to make available the regeneration fluid(s) to heat exchanger 304 evaluates the ambient air temperature at water generating unit 301 and/or the ambient air relative humidity at water generating unit 301 when water generating unit 301 is configured to receive the atmospheric process fluid.

In various embodiments, the control algorithm controlling (a) the electrical switch(es) of the electrical line configured to electrically couple exogenous electricity source 392 to second endogenous heat source 303, (b) the valve(s) of the conduit(s) configured to make available the regeneration fluid(s) to first endogenous heat source 302, (c) the valve(s) of the conduit(s) configured to make available the regeneration fluid(s) to second endogenous heat source 303, and/or (d) the valve(s) of the conduit(s) configured to make available the regeneration fluid(s) to heat exchanger 304 evaluates the temperature of the exhaust process fluid and/or the relative humidity of the exhaust process fluid when water generating unit 301 is configured to receive the exhaust process fluid.

In various embodiments, the control algorithm controlling (a) the electrical switch(es) of the electrical line configured to electrically couple exogenous electricity source 392 to second endogenous heat source 303, (b) the valve(s) of the conduit(s) configured to make available the regeneration fluid(s) to first endogenous heat source 302, (c) the valve(s) of the conduit(s) configured to make available the regeneration fluid(s) to second endogenous heat source 303, and/or (d) the valve(s) of the conduit(s) configured to make available the regeneration fluid(s) to heat exchanger 304 evaluates the endogenously generated heat temperature of the endogenously generated heat generated by first endogenous heat source 302 and/or the endogenously generated heat rate of flow of the endogenously generated heat generated by first endogenous heat source 302 when water generating unit 301 comprises first endogenous heat source 302.

In various embodiments, the control algorithm controlling (a) the electrical switch(es) of the electrical line configured to electrically couple exogenous electricity source 392 to second endogenous heat source 303, (b) the valve(s) of the conduit(s) configured to make available the regeneration fluid(s) to first endogenous heat source 302, (c) the valve(s) of the conduit(s) configured to make available the regeneration fluid(s) to second endogenous heat source 303, and/or (d) the valve(s) of the conduit(s) configured to make available the regeneration fluid(s) to heat exchanger 304 evaluates the endogenously generated heat temperature of the endogenously generated heat generated by second endogenous heat source 303 and/or the endogenously generated heat rate of flow of the endogenously generated heat generated by second endogenous heat source 303 when water generating unit 301 comprises second endogenous heat source 303.

In various embodiments, the control algorithm controlling (a) the electrical switch(es) of the electrical line configured to electrically couple exogenous electricity source 392 to second endogenous heat source 303, (b) the valve(s) of the conduit(s) configured to make available the regeneration fluid(s) to first endogenous heat source 302, (c) the valve(s) of the conduit(s) configured to make available the regeneration fluid(s) to second endogenous heat source 303, and/or (d) the valve(s) of the conduit(s) configured to make available the regeneration fluid(s) to heat exchanger 304 evaluates the exogenously generated heat temperature of the exogenously generated heat received by heat exchanger 304 and/or the exogenously generated heat rate of flow of the exogenously generated heat received by heat exchanger 304 when water generating unit 301 comprises heat exchanger 304.

In various embodiments, the control algorithm controlling (a) the electrical switch(es) of the electrical line configured to electrically couple exogenous electricity source 392 to second endogenous heat source 303, (b) the valve(s) of the conduit(s) configured to make available the regeneration fluid(s) to first endogenous heat source 302, (c) the valve(s) of the conduit(s) configured to make available the regeneration fluid(s) to second endogenous heat source 303, and/or (d) the valve(s) of the conduit(s) configured to make available the regeneration fluid(s) to heat exchanger 304 evaluates (i) the buy back rate of the exogenously generated electricity generated by exogenous electricity source 392, (ii) the temperature of the inverter of exogenous electricity source 392, (iii) the available electric power of the exogenously generated electricity generated by exogenous electricity source 392, (iv) the potential available electric power of the exogenously generated electricity generated by exogenous electricity source 392, (v) the available quantity of stored water stored by water generating unit 301, (vi) the water use pattern of the user of water generating unit 301, (vii) the forecast of weather at water generating unit 301, (viii) the date, (ix) the clock time, and/or (x) the location of water generating unit 301 when water generating system 300 comprises second endogenous heat source 303 and/or when water generating system 300 is configured to generate water using exogenously generated electricity generated by exogenous electricity source 392.

In various embodiments, the control algorithm controlling (a) the electrical switch(es) of the electrical line configured to electrically couple exogenous electricity source 392 to second endogenous heat source 303, (b) the valve(s) of the conduit(s) configured to make available the regeneration fluid(s) to first endogenous heat source 302, (c) the valve(s) of the conduit(s) configured to make available the regeneration fluid(s) to second endogenous heat source 303, and/or (d) the valve(s) of the conduit(s) configured to make available the regeneration fluid(s) to heat exchanger 304 evaluates at least one alternative use for the exogenously generated heat received by heat exchanger 304 when water generating system 300 comprises heat exchanger 304 and/or when water generating system 300 is configured to generate water using exogenously generated heat received by heat exchanger 304.

In various embodiments, water generating unit control system 314 communicates with one or more databases to retrieve (e.g., retrieve in real-time) the buy back rate of the exogenously generated electricity generated by exogenous electricity source 392 in order to determine the buy back rate of the exogenously generated electricity generated by exogenous electricity source 392. In various embodiments, the database(s) can be maintained by a third party (e.g., a public utility).

In various embodiments, water generating unit control system 314 communicates with one or more sensors (e.g., one or more temperature sensors) configured to detect the temperature of the inverter of exogenous electricity source 392 in order to determine the temperature of the inverter of exogenous electricity source 392.

In various embodiments, water generating unit control system 314 communicates with one or more sensors (e.g., one or more voltage sensors and one or more current sensors) configured to detect voltage and current values of the exogenously generated electricity generated by exogenous electricity source 392 and calculates the available electric power of the exogenously generated electricity generated by exogenous electricity source 392 from the voltage and current values to determine the available electric power of the exogenously generated electricity generated by exogenous electricity source 392.

In various embodiments, water generating unit control system 314 communicates with one or more databases to retrieve (e.g., retrieve in real-time) the potential available electric power of the exogenously generated electricity generated by exogenous electricity source 392 in order to determine the potential available electric power of the exogenously generated electricity generated by exogenous electricity source 392. In these embodiments, the specifications for exogenous electricity source 392 can be stored at and retrieved from the database(s). In various embodiments, the database(s) can be maintained by the operator of water generating unit 301, the operator of water generating unit control system 314, and/or by a third party.

In various embodiments, water generating unit control system 314 communicates with one or more sensors (e.g., one or more water level sensors) configured to detect the available quantity of stored water stored by water generating unit 301 in order to determine the available quantity of stored water stored by water generating unit 301.

In various embodiments, water generating unit control system 314 communicates with one or more databases to retrieve (e.g., retrieve in real-time) the water use pattern of the user of water generating unit 301 in order to determine the water use pattern of the user of water generating unit 301. In these embodiments, the operator of water generating unit 301 can track water use by the user of water generating unit 301 during the increments of time of the water use pattern, and can store that information in the database(s). In various embodiments, the database(s) can be maintained by the operator of water generating unit 301 and/or the operator of water generating unit control system 314.

In various embodiments, water generating unit control system 314 communicates with one or more databases to retrieve (e.g., retrieve in real-time) the forecast of weather at water generating unit 301 in order to determine the forecast of weather at water generating unit 301. In various embodiments, the database(s) can be maintained by a third party (e.g., a news media entity).

In various embodiments, water generating unit control system 314 references a system clock of water generating unit control system 314 in order to determine the date and/or clock time.

In various embodiments, water generating unit control system 314 communicates with one or more databases to retrieve (e.g., retrieve in real-time) the location of water generating unit 301 in order to determine the location of water generating unit 301. In these embodiments, the location of water generating unit 301 can be stored at and retrieved from the database(s). In various embodiments, the database(s) can be maintained by the operator of water generating unit 301 and/or the operator of water generating unit control system 314. In other embodiments, water generating unit control system 314 can communicate with one or more sensors (e.g., one or more position sensors) configured to detect the location of water generating unit 301 in order to determine the location of water generating unit 301. For example, the position sensor(s) can be part of a global positioning system.

In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, when a buy back rate of the exogenously generated electricity generated by exogenous electricity source 392 is less than or equal to a predetermined buy back rate. In various embodiments, water generating unit control system 314 can open the electrical switch(es) of the electrical line configured to electrically couple exogenous electricity source 392 to second endogenous heat source 303, and/or can close the valve(s) of the conduit(s) configured to make available the regeneration fluid(s) to second endogenous heat source 303, when the buy back rate of the exogenously generated electricity generated by exogenous electricity source 392 is greater than the predetermined buy back rate. The predetermined buy back rate can be selected as the market price of the water generated using the unit of the exogenously generated electricity generated by exogenous electricity source 392, and/or as a predetermined percentage of the market price of the water generated using the unit of the exogenously generated electricity generated by exogenous electricity source 392.

In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, when an endogenously generated heat temperature of the endogenously generated heat generated by second endogenous heat source 303 is greater than an endogenously generated heat temperature of the endogenously generated heat generated by first endogenous heat source 302 and/or when an endogenously generated heat rate of flow of the endogenously generated heat generated by second endogenous heat source 303 is greater than an endogenously generated heat rate of flow of the endogenously generated heat generated by first endogenous heat source 302. In various embodiments, water generating unit control system 314 opens the electrical switch(es) of the electrical line configured to electrically couple exogenous electricity source 392 to second endogenous heat source 303, and/or closes the valve(s) of the conduit(s) configured to make available the regeneration fluid(s) to second endogenous heat source 303, when an endogenously generated heat temperature of the endogenously generated heat generated by second endogenous heat source 303 is less than or equal to an endogenously generated heat temperature of the endogenously generated heat generated by first endogenous heat source 302 and/or when an endogenously generated heat rate of flow of the endogenously generated heat generated by second endogenous heat source 303 is less than or equal to an endogenously generated heat rate of flow of the endogenously generated heat generated by first endogenous heat source 302.

In various embodiments, water generating unit control system 314 closes the electrical switch(es) of the electrical line configured to electrically couple exogenous electricity source 392 to second endogenous heat source 303 and/or opens the valve(s) of the conduit(s) configured to make available the regeneration fluid(s) to second endogenous heat source 303 when a temperature of an inverter of exogenous electricity source 392 is greater than or equal to a predetermined temperature. Alternatively, in various embodiments, water generating unit control system 314 opens the electrical switch(es) of the electrical line configured to electrically couple exogenous electricity source 392 to second endogenous heat source 303 and/or closes the valve(s) of the conduit(s) configured to make available the regeneration fluid(s) to second endogenous heat source 303 when a temperature of an inverter of exogenous electricity source 392 is less than the predetermined temperature. For example, the predetermined temperature can be selected as a temperature at which heat energy losses resulting from converting exogenously generated electricity generated by exogenous electricity source 392 to alternating current, such as, for example, to sell and transfer the electricity generated by exogenous electricity source 392 to a third party is determined to be significant. In some embodiments, the heat energy losses can be determined to be significant when a predetermined percentage of the exogenously generated electricity generated by exogenous electricity source 392 is lost to heat energy losses (e.g., two percent, five percent, ten percent, twenty-five percent, fifty percent, or more).

In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, when an available electric power of the exogenously generated electricity generated by exogenous electricity source 392 is greater than a predetermined electric power and/or when a potential available electric power of the exogenously generated electricity generated by exogenous electricity source 392 is greater than a predetermined potential electric power. In various embodiments, water generating unit control system 314 opens the electrical switch(es) of the electrical line configured to electrically couple exogenous electricity source 392 to second endogenous heat source 303, and/or closes the valve(s) of the conduit(s) configured to make available the regeneration fluid(s) to second endogenous heat source 303, when the available electric power of the exogenously generated electricity generated by exogenous electricity source 392 is less than or equal to the predetermined electric power and/or when the potential available electric power of the exogenously generated electricity generated by exogenous electricity source 392 is less than or equal to the predetermined potential electric power. For example, the predetermined electric power and/or the predetermined potential electric power can be set by the operator of water generating system 300 to ensure that there is sufficient exogenously generated electricity generated by exogenous electricity source 392 to electrically power one or more other devices, and/or to ensure that there is sufficient exogenously generated electricity generated by exogenous electricity source 392 to sell to a third party (e.g., a public utility).

In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, when an available quantity of stored water stored by water generating unit 301 is less than a predetermined quantity of stored water. In various embodiments, water generating unit control system 314 opens the electrical switch(es) of the electrical line configured to electrically couple exogenous electricity source 392 to second endogenous heat source 303, and/or closes the valve(s) of the conduit(s) configured to make available the regeneration fluid(s) to second endogenous heat source 303, when an available quantity of stored water stored by water generating unit 301 is greater than or equal to the predetermined quantity of stored water. In various embodiments, the predetermined quantity of stored water can be selected to ensure that at least a minimum amount of water is made available to the user of water generating unit 301.

In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, when the water use pattern of the user of water generating unit 301 indicates that there is less water available than the user customarily uses at the relevant increment of time (e.g., hour, day, week, etc.). In various embodiments, water generating unit control system 314 opens the electrical switch(es) of the electrical line configured to electrically couple exogenous electricity source 392 to second endogenous heat source 303, and/or closes the valve(s) of the conduit(s) configured to make available the regeneration fluid(s) to second endogenous heat source 303, when the water use pattern of the user of water generating unit 301 indicates that there is more water available or the same amount of water available that the user customarily uses at the relevant increment of time (e.g., hour, day, week, etc.).

In various embodiments, water generating unit control system 314 closes the electrical switch(es) of the electrical line configured to electrically couple exogenous electricity source 392 to second endogenous heat source 303, and/or can open the valve(s) of the conduit(s) configured to make available the regeneration fluid(s) to second endogenous heat source 303, when a weather forecast indicates that a current or future ambient air relative humidity at water generating unit 301 is or will be below a predetermined humidity and/or when a weather forecast indicates that it is or will be cloudy. In various embodiments, water generating unit control system 314 opens the electrical switch(es) of the electrical line configured to electrically couple exogenous electricity source 392 to second endogenous heat source 303, and/or closes the valve(s) of the conduit(s) configured to make available the regeneration fluid(s) to second endogenous heat source 303, when the weather forecast indicates that the current or future ambient air relative humidity at water generating unit 301 is or will be above or equal to the predetermined humidity and/or when the weather forecast indicates that it is or will be sunny. In various embodiments, the predetermined humidity can be selected as a humidity at which water generating unit 301 will be able to make too little water relying on only solar thermal heat.

In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, at certain predetermined times and/or on certain predetermined days. In various embodiments, water generating unit control system 314 opens the electrical switch(es) of the electrical line configured to electrically couple exogenous electricity source 392 to second endogenous heat source 303, and/or closes the valve(s) of the conduit(s) configured to make available the regeneration fluid(s) to second endogenous heat source 303, at certain other predetermined times and/or on certain other predetermined days. In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, during night hours and opens the electrical switch(es) of the electrical line configured to electrically couple exogenous electricity source 392 to second endogenous heat source 303, and/or closes the valve(s) of the conduit(s) configured to make available the regeneration fluid(s) to second endogenous heat source 303, during day hours. In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, during fall, summer, and/or spring months, and opens the electrical switch(es) of the electrical line configured to electrically couple exogenous electricity source 392 to second endogenous heat source 303, and/or closes the valve(s) of the conduit(s) configured to make available the regeneration fluid(s) to second endogenous heat source 303, during winter months.

In various embodiments, when first endogenous heat source 302 comprises a solar thermal heater, when second endogenous heat source 303 comprises an electric heater, and when the exogenous electricity source 392 comprises a photovoltaic system, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, upon detecting a rise in the ambient air relative humidity at water generating unit 301. In various embodiments, the rise in the ambient air relative humidity can result from a storm. In various embodiments, the water generating unit 301, including first endogenous heat source 302 may be oriented more to the east than exogenous electricity source 392, because, for example, aiming water generating unit 301 more to the east may increase the amount of humidity in the atmospheric process fluid received by water generating unit 301 whereas aiming exogenous electricity source 392 south in the northern hemisphere and north in the southern hemisphere may increase photovoltaic output of exogenous electricity source 392. As a result, whereas first endogenous heat source 302 may receive too little sunlight in the storm to generate sufficient heat to take advantage of the increased humidity resulting from the storm when generating water, second endogenous heat source 303, as a result of being aimed more to the south, may obtain sufficient sunlight to take advantage of the increased humidity resulting from the storm when generating water.

In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, at certain locations; and opens the electrical switch(es) of the electrical line configured to electrically couple exogenous electricity source 392 to second endogenous heat source 303, and/or closes the valve(s) of the conduit(s) configured to make available the regeneration fluid(s) to second endogenous heat source 303, at other locations. In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to second endogenous heat source 303, at locations below a predetermined latitude; and opens the electrical switch(es) of the electrical line configured to electrically couple exogenous electricity source 392 to second endogenous heat source 303, and/or can close the valve(s) of the conduit(s) configured to make available the regeneration fluid(s) to second endogenous heat source 303, at locations above the predetermined latitude.

In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to heat exchanger 304, when an exogenously generated heat temperature of the exogenously generated heat received by heat exchanger 304 is greater than or equal to an endogenously generated heat temperature of the endogenously generated heat generated by first endogenous heat source 302 and/or an endogenously generated heat temperature of the endogenously generated heat generated by second endogenous heat source 303. In various embodiments, water generating unit control system 314 opens the electrical switch(es) of the electrical line configured to electrically couple exogenous electricity source 392 to second endogenous heat source 303, and/or can close the valve(s) of the conduit(s) configured to make available the regeneration fluid(s) to heat exchanger 304, when the exogenously generated heat temperature of the exogenously generated heat received by heat exchanger 304 is less than the endogenously generated heat temperature of the endogenously generated heat generated by first endogenous heat source 302 and/or the endogenously generated heat temperature of the endogenously generated heat generated by second endogenous heat source 303.

In various embodiments, water generating unit control system 314 closes the electrical switch(es) of the electrical line configured to electrically couple exogenous electricity source 392 to second endogenous heat source 303, and/or opens the valve(s) of the conduit(s) configured to make available the regeneration fluid(s) to heat exchanger 304, when an exogenously generated heat rate of flow of the exogenously generated heat received by heat exchanger 304 is greater than or equal to an endogenously generated heat rate of flow of the endogenously generated heat generated by first endogenous heat source 302 and/or an endogenously generated heat rate of flow of the endogenously generated heat generated by second endogenous heat source 303. In various embodiments, water generating unit control system 314 opens the electrical switch(es) of the electrical line configured to electrically couple exogenous electricity source 392 to second endogenous heat source 303, and/or closes the valve(s) of the conduit(s) configured to make available the regeneration fluid(s) to heat exchanger 304, when the exogenously generated heat rate of flow of the exogenously generated heat received by heat exchanger 304 is less than the endogenously generated heat rate of flow of the endogenously generated heat generated by first endogenous heat source 302 and/or the endogenously generated heat rate of flow of the endogenously generated heat generated by second endogenous heat source 303.

In various embodiments, water generating unit control system 314 closes the valve(s) of the conduit(s) configured to make available the regeneration fluid(s) to heat exchanger 304 when at least one alternative use of the exogenously generated heat received by heat exchanger 304 is identified, and/or when at least one predetermined alternative use of the exogenously generated heat received by heat exchanger 304 is identified. In various embodiments, water generating unit control system 314 opens the valve(s) of the conduit(s) configured to make available the regeneration fluid(s) to heat exchanger 304 when no other alternative use of the exogenously generated heat received by heat exchanger 304 is identified, and/or when no predetermined alternative use or uses of the exogenously generated heat received by heat exchanger 304 is or are identified.

In various embodiments, water generating unit control system 314 communicates with one or more sensors (e.g., one or more particle sensors, one or more gas sensors, etc.) configured to detect a presence and/or a quantity of one or more materials toxic to humans, pets, and/or other animals in the process fluid(s). Further, water generating unit control system 314 can be configured to prevent water generating unit 301 from generating water when these material(s) are detected and/or when a predetermined quantity or more of these material(s) are present in the process fluid(s). For example, in some embodiments, one or more gases (e.g., carbon monoxide) emitted by exogenous heat source 391, exogenous electricity source 392, and/or exhaust process fluid source 393 may mix with the process fluid(s). Accordingly, in various embodiments, in response to detecting a presence and/or a quantity of one or more materials toxic to humans, pets, and/or other animals, water generating unit control system 314 can disable water generating unit 301.

Figure 2:
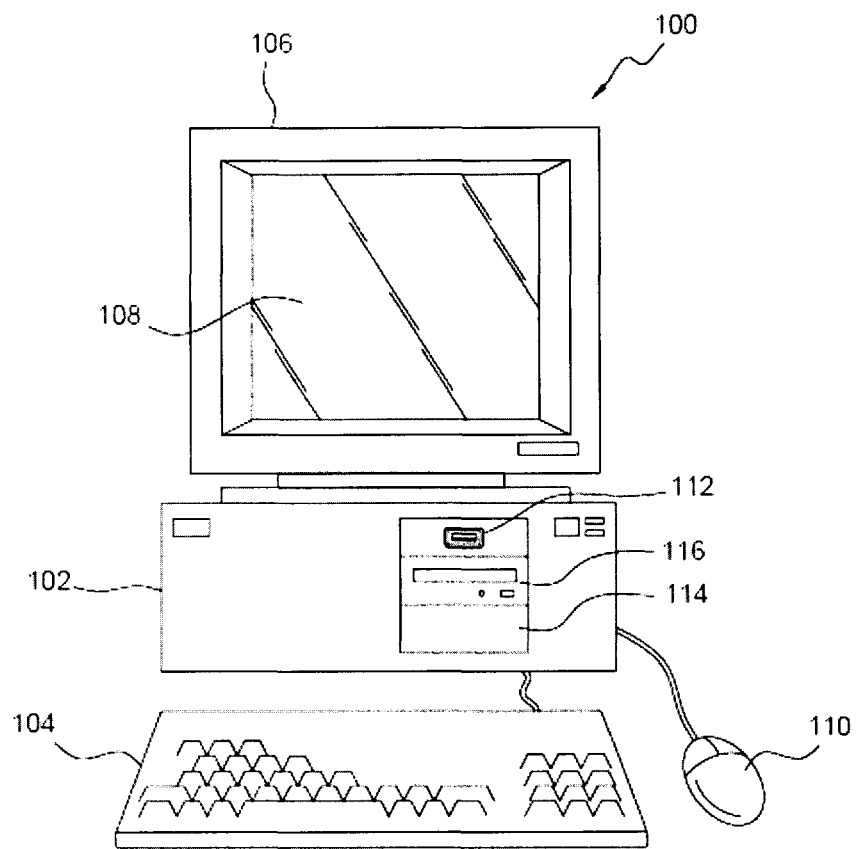
FIG. 2 illustrates a front elevational view of an exemplary computer system that is suitable to implement at least part of a water generating system, and/or to implement at least part of a method described herein, according to various embodiments.

In various embodiments, water generating unit control system 314 comprises any suitable device or devices configured to control one or more parts of water generating unit 301. For example, water generating unit control system 314 can comprise a computer system configured to control the one or more parts of water generating unit 301. Further, the computer system of water generating unit control system 314 can comprise one or more processors and one or more memory storage devices (e.g., one or more non-transitory memory storage devices). In these or other embodiments, the processor(s) and/or the memory storage device(s) can be similar or identical to the processor(s) and/or memory storage device(s) (e.g., non-transitory memory storage devices) described below with respect to computer system 100 (FIG. 2). In various embodiments, the computer system of water generating unit control system 314 comprises a single computer or server, but in many embodiments, the computer system of water generating unit control system 314 comprises a cluster or collection of computers or servers and/or a cloud of computers or servers. Further, in these or other embodiments, the computer system of water generating unit control system 314 can be implemented with a distributed network comprising a distributed memory architecture. The distributed memory architecture can reduce the impact on the distributed network and system resources to reduce congestion in bottlenecks while still allowing data to be accessible from a central location.

Further, in various embodiments, water generating unit control system 314 is electrically coupled to any parts of water generating unit 301 that water generating unit control system 314 is configured to control. For example, in various embodiments, water generating unit control system 314 is electrically coupled to first endogenous heat source 302, second endogenous heat source 303, condenser 306, blower 307, circulator 308, actuator 312, one or more valve(s) of water generating unit 301, one or more electrical switch(es) of water generating unit 301, etc. Further, water generating unit control system 314 can be electrically coupled to any sensor or sensors (e.g., one or more temperature sensors, one or more humidity sensors, one or more fluid flow rate sensors, one or more heat rate of flow sensors, one or more mass flow rate sensors, one or more particle sensors, one or more gas sensors, one or more voltage sensors, one or more current sensors, one or more water level sensors, one or more position sensors, etc.) from which water generating unit control system 314 obtains measurements. In some embodiments, one or more of the sensor(s) are part of water generating system 300, water generating unit 301 and/or water generating unit control system 314.

In various embodiments, water generating unit control system 314 is located remotely from where water generating unit 301 generates water when controlling operation of water generating unit 301. However, in other embodiments, water generating unit control system 314 is located near to or at a location where water generating unit 301 generates water when controlling operation of water generating unit 301.

In some embodiments, one or more of the control algorithms employed by water generating unit control system 314 are deterministic. In other embodiments, one or more of the control algorithms employed by water generating unit control system 314 are adaptive through machine learning.

Although water generating system 300 is described with respect to one exogenous heat source (i.e., exogenous heat source 391), in some embodiments, water generating system 300 is modified and implemented to use exogenously generated heat received from one or more additional exogenous heat sources, simultaneously and/or at different times. In these embodiments, the exogenously generated heat of the multiple exogenous heat sources can be received by one heat exchanger (e.g., heat exchanger 304) or multiple heat exchangers similar or identical to heat exchanger 304. Further, the additional exogenous heat sources can be similar or identical to exogenous heat source 391.

Further, although water generating system 300 is described with respect to one exogenous electricity source (i.e., exogenous electricity source 392), in some embodiments, water generating system 300 is modified and implemented to use exogenously generated electricity generated by one or more additional exogenous electricity sources, simultaneously and/or at different times. In these embodiments, the exogenously generated electricity of the multiple exogenous electricity sources is received by and used to electrically power one endogenous heat source (e.g., second endogenous heat source 303) or multiple endogenous heat sources similar or identical to second endogenous heat source 303. Further, the additional endogenous heat sources can be similar or identical to second endogenous heat source 303.

Further, although water generating system 300 is described with respect to one exhaust process fluid source (i.e., exhaust process fluid source 393), in some embodiments, water generating system 300 is modified and implemented to use one or more additional exhaust process fluids generated by one or more additional exhaust process fluid sources, simultaneously and/or at different times. In these embodiments, the additional exhaust process fluid sources can be similar or identical to exhaust process fluid source 393.

Further, although water generating system 300 is described with respect to one desiccation device (i.e., desiccation device 305), in some embodiments, water generating system 300 can be modified and implemented with one or more additional desiccation devices, which can be similar or identical to desiccation device 305. In these embodiments, desiccation device 305 and the additional desiccation device(s) can be implemented in series and/or in parallel with each other, as desired.

Figure 4:
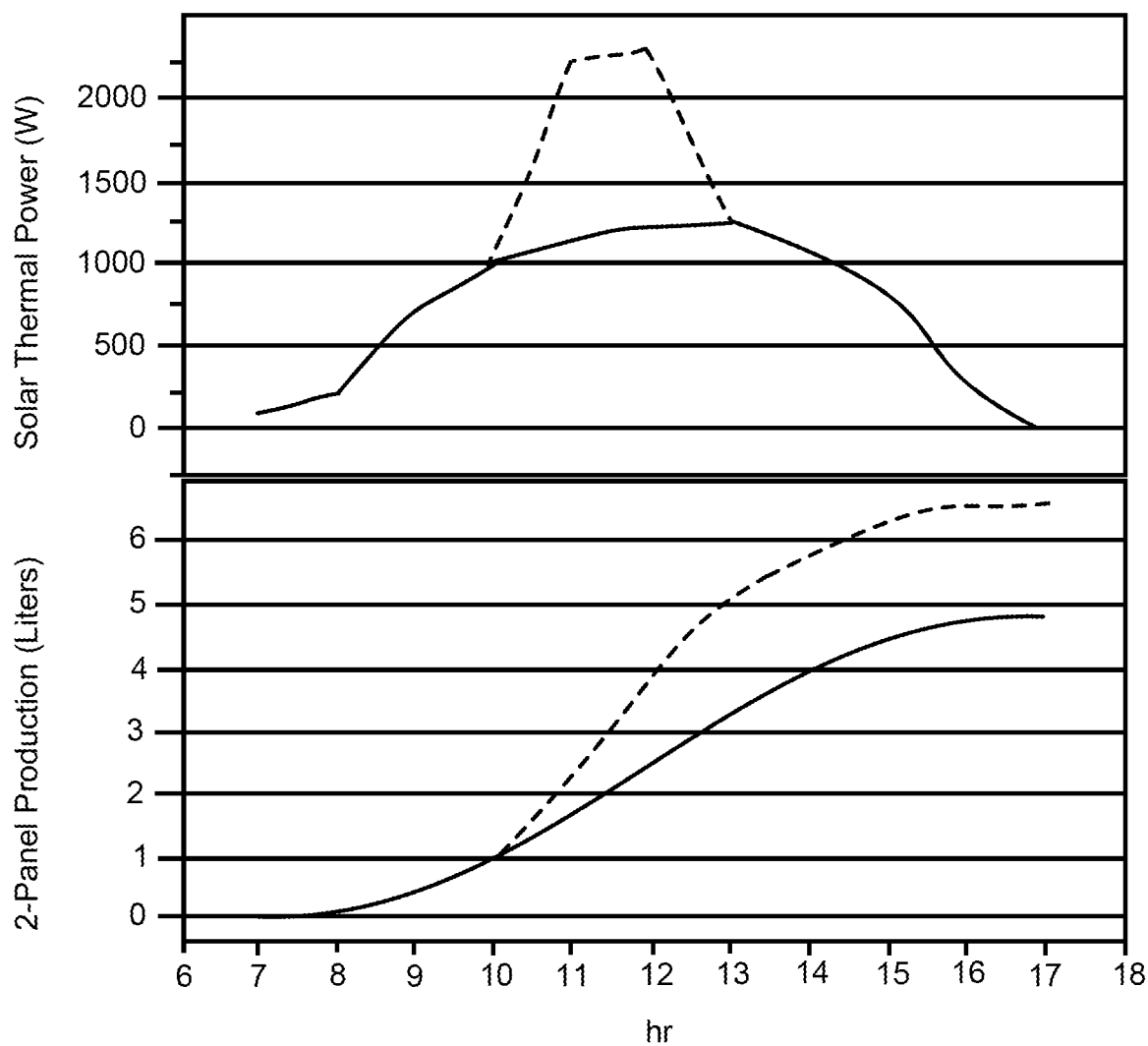
FIG. 4 illustrates an estimated increase in water production in liters for a water generating unit using 1 kilowatt of exogenously generated electricity generated by a photovoltaic system from 11:00 am to 1:00 pm to generate supplemental endogenously generated heat for generating the water, according to various embodiments.

FIG. 4 illustrates an estimated increase in water production in liters for a water generating unit using 1 kilowatt of exogenously generated electricity generated by a photovoltaic system from 11:00 am to 1:00 pm to generate supplemental endogenously generated heat for generating the water. Specifically, FIG. 4 provides a plot (top) of solar thermal power (Watts) as a function of time (hours) and a plot (bottom) of water production (liters) as a function of time (hours) where the lower solid lines in the plots show the solar thermal power and water production without the exogenously generated electricity and the upper dashed lines in the plots show the solar thermal power and water production with the exogenously generated electricity. The water generating unit can be similar or identical to water generating unit 301 (FIG. 1).

Figure 5:
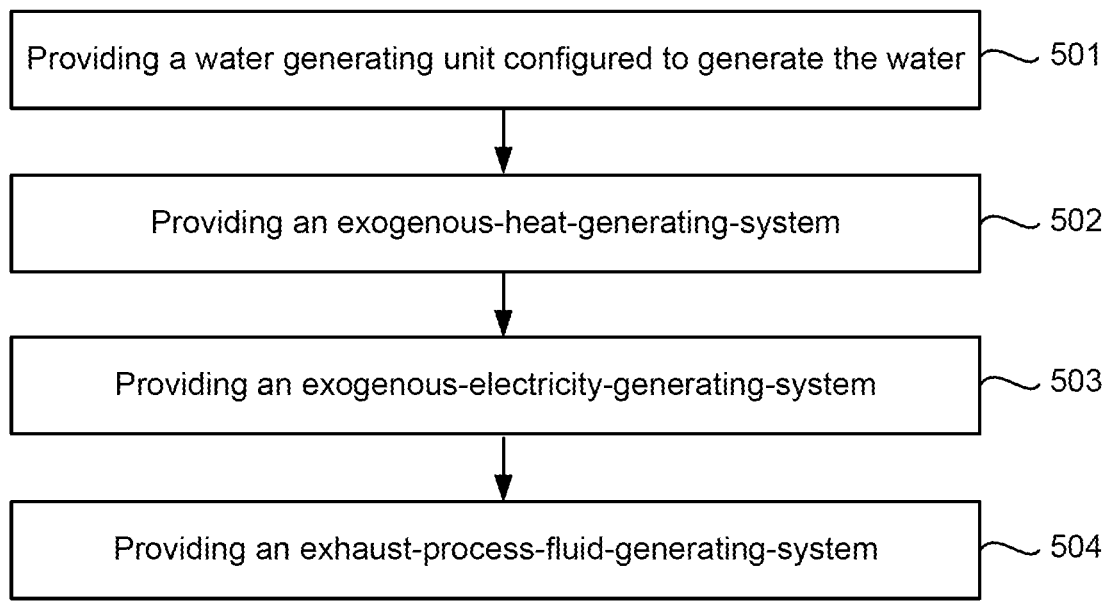
FIG. 5 illustrates a flow chart for an embodiment of a method of providing (e.g., manufacturing) a system, according to various embodiments.

FIG. 5 illustrates a flow chart for an embodiment of a method 500 of providing (e.g., manufacturing) a system. Method 500 is merely exemplary and is not limited to the embodiments presented herein. Method 500 can be employed in many different embodiments or examples not specifically depicted or described herein. In some embodiments, the activities of method 500 are performed in the order presented. In other embodiments, the activities of the method 500 can be performed in any other suitable order. In still other embodiments, one or more of the activities in method 500 can be combined or skipped. In many embodiments, the system is similar or identical to water generating system 300 (FIG. 1).

Figure 6:
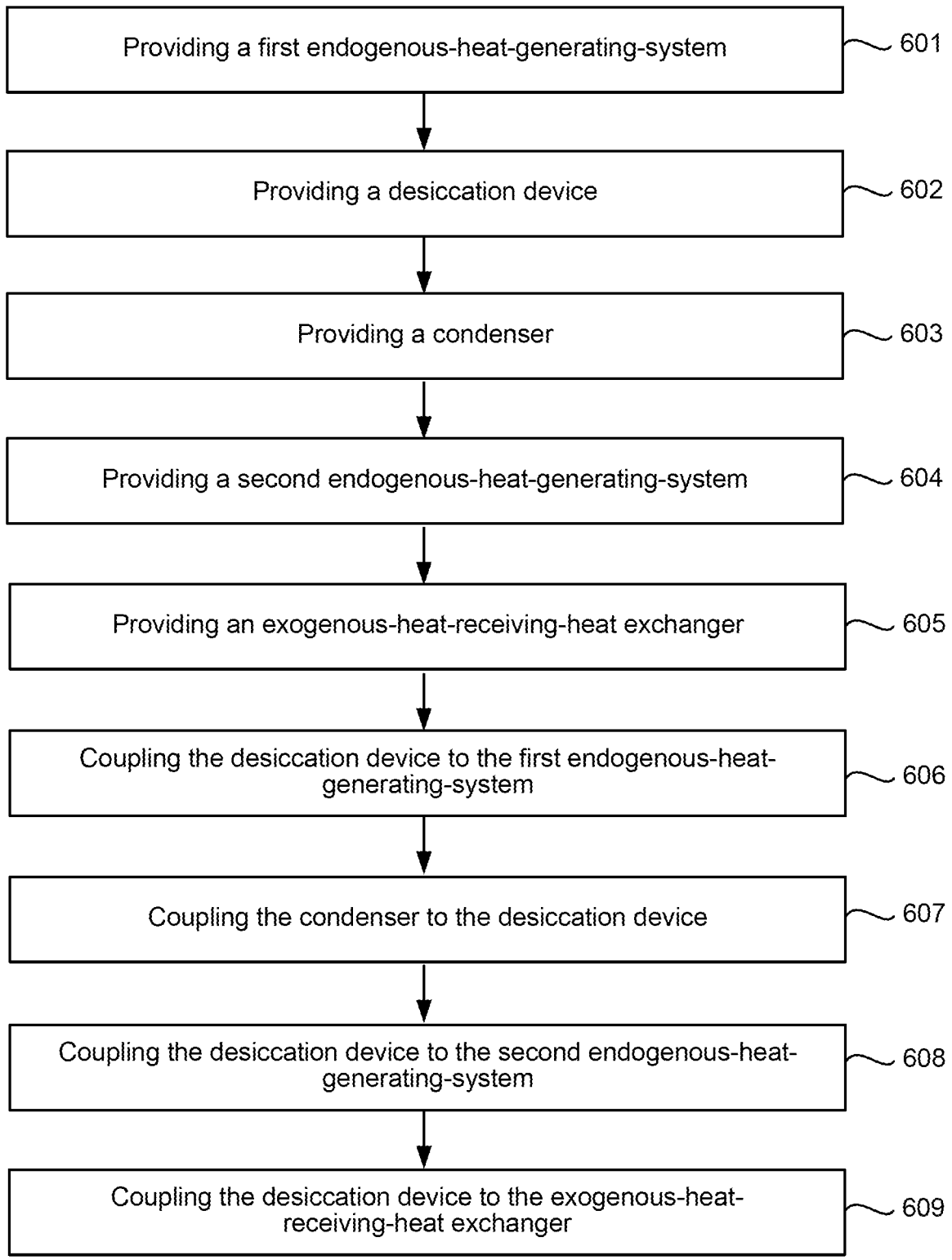
FIG. 6 illustrates a flow chart for an exemplary activity of providing a water generating unit, according to various embodiments.

In various embodiments, method 500 comprises activity 501 of providing (e.g., manufacturing) a water generating unit configured to generate the water. In some embodiments, the water generating unit is similar or identical to water generating unit 301 (FIG. 1). FIG. 6 illustrates a flow chart for an exemplary activity 501, according to the embodiment of FIG. 5.

For example, in many embodiments, activity 501 comprises activity 601 of providing a first endogenous heat source. In some embodiments, the first endogenous heat source is similar or identical to first endogenous heat source 302 (FIG. 1).

In various embodiments, activity 501 comprises activity 602 of providing a desiccation device. In some embodiments, the desiccation device is similar or identical to desiccation device 305 (FIG. 1).

In various embodiments, activity 501 comprises activity 603 of providing a condenser. In some embodiments, the condenser is similar or identical to condenser 306 (FIG. 1).

In various embodiments, activity 501 comprises activity 604 of providing a second endogenous heat source. In some embodiments, the second endogenous heat source is similar or identical to second endogenous heat source 303 (FIG. 1).

In various embodiments, activity 501 comprises activity 605 of providing a heat exchanger. In some embodiments, the heat exchanger is similar or identical to heat exchanger 304 (FIG. 1). In other embodiments, one or two of activity 601, activity 604, or activity 605 are omitted.

In various embodiments, activity 501 comprises activity 606 of coupling the desiccation device to the first endogenous heat source. In some embodiments, activity 606 is omitted, such as, for example, when activity 601 is omitted.

In various embodiments, activity 501 comprises activity 607 of coupling the condenser to the desiccation device.

In various embodiments, activity 501 comprises activity 608 of coupling the desiccation device to the second endogenous heat source. In some embodiments, activity 608 is omitted, such as, for example, when activity 604 is omitted.

In various embodiments, activity 501 comprises activity 609 of coupling the desiccation device to the heat exchanger. In some embodiments, activity 609 is omitted, such as, for example, when activity 605 is omitted.

Referring now back to FIG. 5, in various embodiments, method 500 comprises activity 502 of providing an exogenous heat source. In some embodiments, the exogenous heat source is similar or identical to exogenous heat source 391 (FIG. 1). In some embodiments, activity 502 is omitted. In further embodiments, when method 500 comprises activity 502, activity 502 also comprises coupling the exogenous heat source to the water generating unit (e.g., the heat exchanger).

In various embodiments, method 500 comprises activity 503 of providing an exogenous electricity source. In some embodiments, the exogenous electricity source is similar or identical to exogenous electricity source 392 (FIG. 1). In some embodiments, activity 503 is omitted. In further embodiments, when method 500 comprises activity 503, activity 503 also comprises coupling the exogenous electricity source to the water generating unit (e.g., the second endogenous heat source).

In various embodiments, method 500 comprises activity 504 of providing an exhaust process fluid source. In some embodiments, the exhaust process fluid source is similar or identical to exhaust process fluid source 393. In some embodiments, activity 504 is omitted. In further embodiments, when method 500 comprises activity 504, activity 504 also comprises coupling the exhaust-process-fluid-generating system to the water generating unit.

Figure 7:
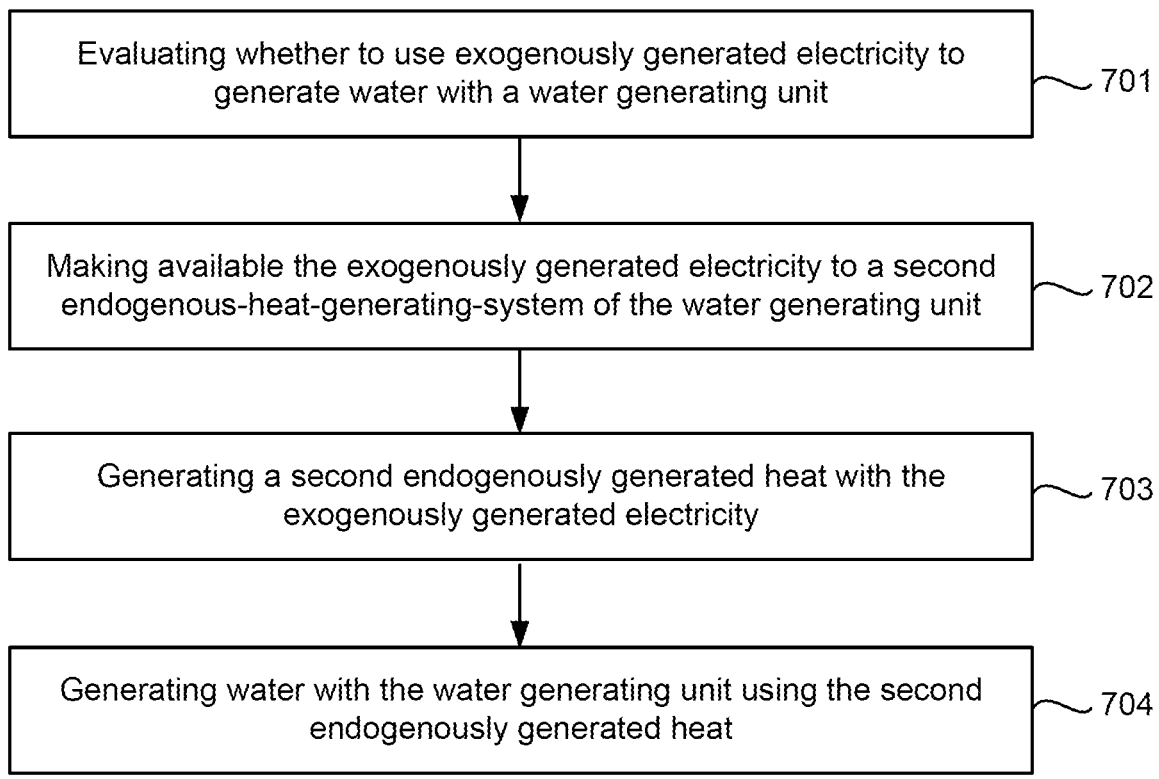
FIG. 7 illustrates a flow chart for an embodiment of a method of generating water using a second endogenous generating heat system, according to various embodiments.

FIG. 7 illustrates a flow chart for an embodiment of a method 700. Method 700 is merely exemplary and is not limited to the embodiments presented herein. Method 700 can be employed in many different embodiments or examples not specifically depicted or described herein. In some embodiments, the activities of method 700 are performed in the order presented. In other embodiments, the activities of the method 700 are performed in any other suitable order. In still other embodiments, one or more of the activities in method 700 are combined or skipped.

In various embodiments, method 700 is implemented via execution of computer instructions configured to run at one or more processors and configured to be stored at one or more non-transitory memory storage devices. In some embodiments, the processor(s) can be similar or identical to the processor(s) described above with respect to computer system 100 (FIG. 2), and/or the non-transitory memory storage device(s) are similar or identical to the non-transitory memory storage device(s) described above with respect to computer system 100 (FIG. 2). Further, the processor(s) and/or non-transitory memory storage device(s) can be part of a water generating unit control system, which can be similar or identical to water generating unit control system 314 (FIG. 1).

Figure 8:
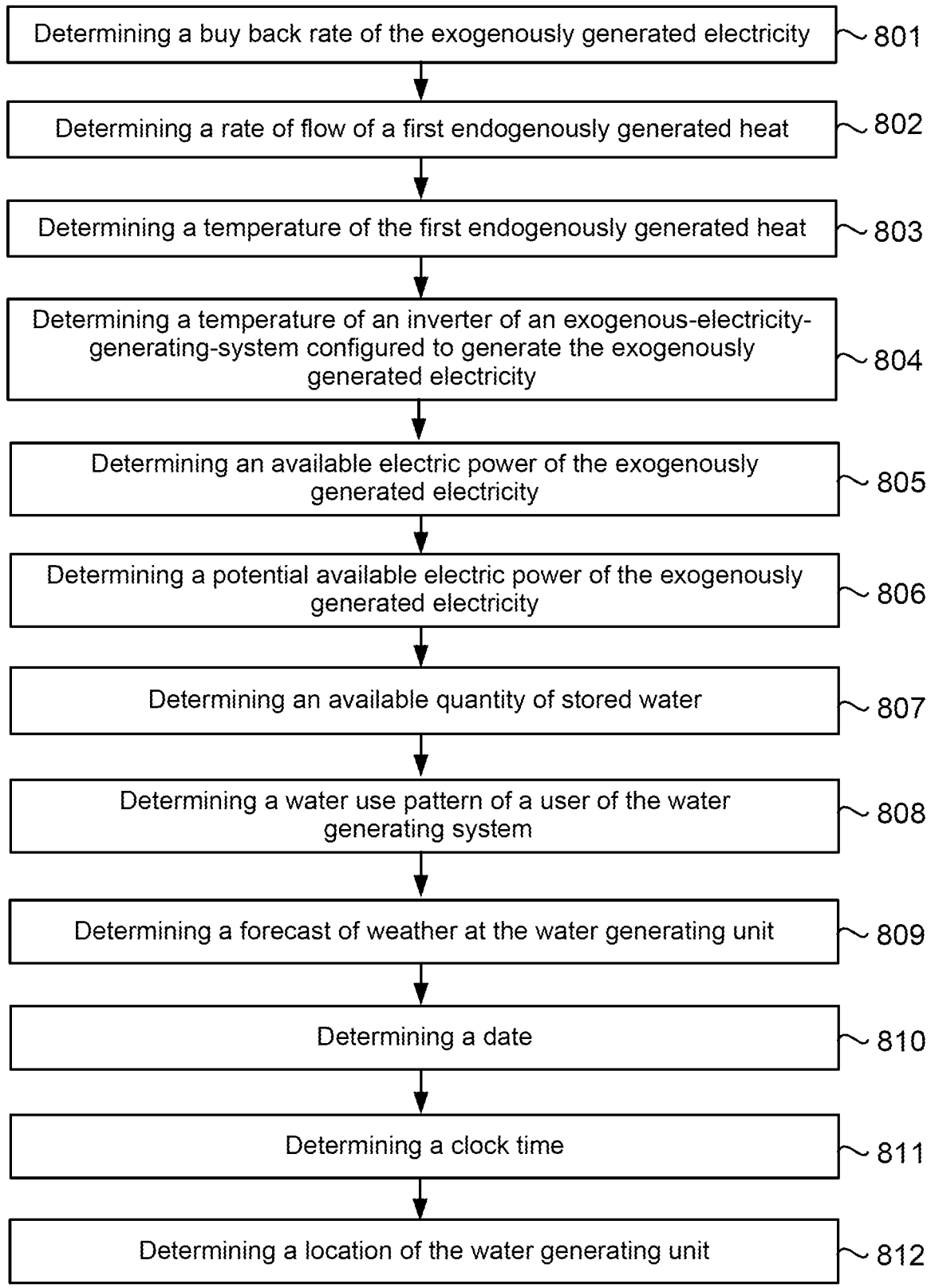
FIG. 8 illustrates a flow chart for an exemplary activity of evaluating whether to use exogenously generated electricity to generate water with a water generating unit, according various embodiments.

In various embodiments, method 700 comprises activity 701 of evaluating whether to use exogenously generated electricity to generate water with a water generating unit. In some embodiments, performing activity 701 is similar or identical to evaluating whether to use exogenously generated electricity to generate water with a water generating unit as described above with respect to water generating system 300 (FIG. 1) and/or water generating unit control system 314 (FIG. 1). Further, the water generating unit can be similar or identical to water generating unit 301 (FIG. 1). Also, the exogenously generated electricity can be similar to the exogenously generated electricity generated by exogenous electricity source 392 (FIG. 1) as described above with respect to water generating system 300 (FIG. 1) and/or water generating unit control system 314 (FIG. 1). FIG. 8 illustrates a flow chart for an exemplary activity 701, according to the embodiment of FIG. 7.

In various embodiments, activity 701 comprises activity 801 of determining a buy back rate of the exogenously generated electricity. In some embodiments, performing activity 801 is similar or identical to determining a buy back rate of the exogenously generated electricity as described above with respect to water generating system 300 (FIG. 1) and/or water generating unit control system 314 (FIG. 1). Further, the buy back rate can be similar or identical to the buy back rate described above with respect to water generating system 300 (FIG. 1) and/or water generating unit control system 314 (FIG. 1).

In various embodiments, activity 701 comprises activity 802 of determining a rate of flow of a first endogenously generated heat. In some embodiments, performing activity 802 is similar or identical to determining a rate of flow of the first endogenously generated heat as described above with respect to water generating system 300 (FIG. 1) and/or water generating unit control system 314 (FIG. 1). Further, the first endogenously generated heat can be similar or identical to the endogenously generated heat generated by first endogenous heat source 302 (FIG. 1).

In various embodiments, activity 701 comprises activity 803 of determining a temperature of the first endogenously generated heat. In some embodiments, performing activity 803 is similar or identical to determining a temperature of the first endogenously generated heat generated as described above with respect to water generating system 300 (FIG. 1) and/or water generating unit control system 314 (FIG. 1).

In various embodiments, activity 701 comprises activity 804 of determining a temperature of an inverter of an exogenous electricity source configured to generate the exogenously generated electricity. In some embodiments, performing activity 804 is similar or identical to determining a temperature of an inverter of an exogenous electricity source configured to generate the exogenously generated electricity. Further, the exogenous electricity source can be similar or identical to exogenous electricity source 392 (FIG. 1).

In various embodiments, activity 701 comprises activity 805 of determining an available electric power of the exogenously generated electricity. In various embodiments, performing activity 805 can be similar or identical to determining an available electric power of the exogenously generated electricity as described above with respect to water generating system 300 (FIG. 1) and/or water generating unit control system 314 (FIG. 1). Further, the available electric power of the exogenously generated electricity can be similar or identical to the available electric power of the exogenously generated electricity as described above with respect to water generating system 300 (FIG. 1) and/or water generating unit control system 314 (FIG. 1).

In various embodiments, activity 701 comprises activity 806 of determining a potential available electric power of the exogenously generated electricity. In some embodiments, performing activity 805 is similar or identical to determining a potential available electric power of the exogenously generated electricity as described above with respect to water generating system 300 (FIG. 1) and/or water generating unit control system 314 (FIG. 1). Further, the potential available electric power of the exogenously generated electricity can be similar or identical to the potential available electric power of the exogenously generated electricity as described above with respect to water generating system 300 (FIG. 1) and/or water generating unit control system 314 (FIG. 1).

In various embodiments, activity 701 comprises activity 807 of determining an available quantity of stored water. In some embodiments, performing activity 807 is similar or identical to determining an available quantity of stored water as described above with respect to water generating system 300 (FIG. 1) and/or water generating unit control system 314 (FIG. 1). Further, the available quantity of stored water can be similar or identical to the quantity of stored water described above with respect to water generating system 300 (FIG. 1) and/or water generating unit control system 314 (FIG. 1).

In various embodiments, activity 701 comprises activity 808 of determining a water use pattern of a user of the water generating system. In some embodiments, performing activity 808 is similar or identical to determining a water use pattern of a user of the water generating system as described above with respect to water generating system 300 (FIG. 1) and/or water generating unit control system 314 (FIG. 1). Further, the water use pattern of the user of the water generating system can be similar or identical to the water use pattern of the user of the water generating system described above with respect to water generating system 300 (FIG. 1) and/or water generating unit control system 314 (FIG. 1).

In various embodiments, activity 701 comprises activity 809 of determining a forecast of weather at the water generating unit. Performing activity 809 can be similar or identical to determining a forecast of weather at the water generating unit as described above with respect to water generating system 300 (FIG. 1) and/or water generating unit control system 314 (FIG. 1).

In various embodiments, activity 701 comprises activity 810 of determining a date. In some embodiments, performing activity 810 can be similar or identical to determining a date as described above with respect to water generating system 300 (FIG. 1) and/or water generating unit control system 314 (FIG. 1).

In various embodiments, activity 701 comprises activity 811 of determining a clock time. In some embodiments, performing activity 811 is similar or identical to determining a clock time as described above with respect to water generating system 300 (FIG. 1) and/or water generating unit control system 314 (FIG. 1).

In various embodiments, activity 701 comprises activity 812 of determining a location of the water generating unit. In some embodiments, performing activity 812 is similar or identical to determining a location of the water generating unit as described above with respect to water generating system 300 (FIG. 1) and/or water generating unit control system 314 (FIG. 1).

Referring now back to FIG. 7, in various embodiments, method 700 comprises activity 702 of making available the exogenously generated electricity to a second endogenous heat source of the water generating unit. In some embodiments, performing activity 702 is similar or identical to making available the exogenously generated electricity to a second endogenous heat source of the water generating unit as described above with respect to water generating system 300 (FIG. 1) and/or water generating unit control system 314 (FIG. 1). Further, the second endogenous heat source can be similar or identical to second endogenous heat source 303 (FIG. 1). In some embodiments, activity 702 can be performed after activity 701.

In various embodiments, method 700 comprises activity 703 of generating second endogenously generated heat with the exogenously generated electricity. In some embodiments, performing activity 703 is similar or identical to generating the second endogenously generated heat with the exogenously generated electricity as described above with respect to water generating system 300 (FIG. 1) and/or water generating unit control system 314 (FIG. 1). Further, the second endogenously generated heat can be similar or identical to the endogenously generated heat generated by second endogenous heat source as described above with respect to water generating system 300 (FIG. 1) and/or water generating unit control system 314 (FIG. 1).

In various embodiments, method 700 comprises activity 704 of generating water with the water generating unit using the second endogenously generated heat. In some embodiments, performing activity 704 is similar or identical to generating water with the water generating unit using the second endogenously generated heat as described above with respect to water generating system 300 (FIG. 1) and/or water generating unit control system 314 (FIG. 1).

Figure 9:
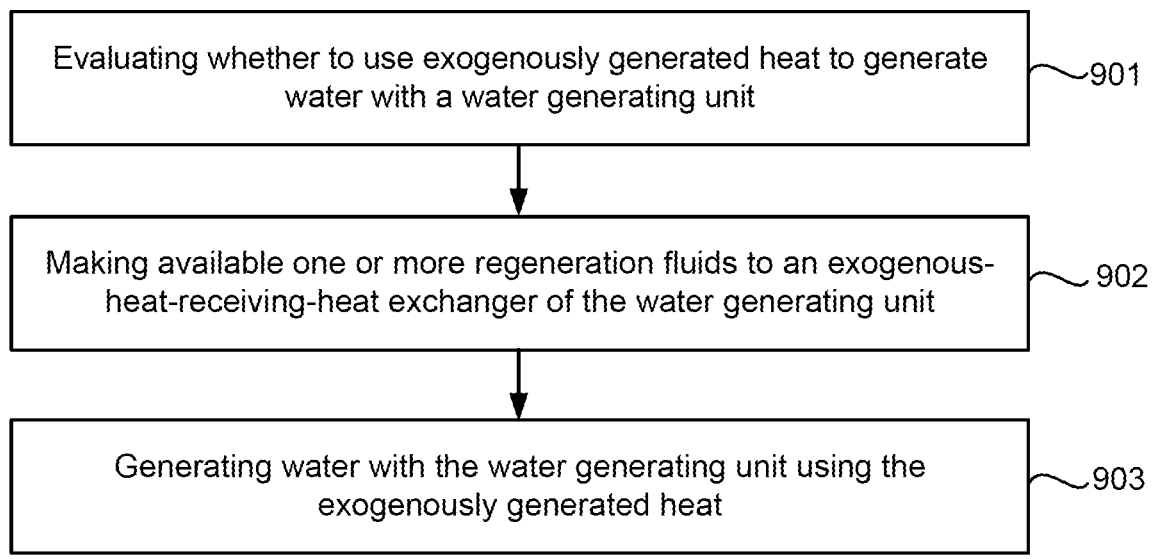
FIG. 9 illustrates a flow chart for an embodiment of a method of generating water using exogenously generated heat, according to various embodiments.

FIG. 9 illustrates a flow chart for an embodiment of a method 900. Method 900 is merely exemplary and is not limited to the embodiments presented herein. Method 900 can be employed in many different embodiments or examples not specifically depicted or described herein. In some embodiments, the activities of method 900 is performed in the order presented. In other embodiments, the activities of the method 900 is performed in any other suitable order. In still other embodiments, one or more of the activities in method 900 are combined or skipped.

In various embodiments, method 900 is implemented via execution of computer instructions configured to run at one or more processors and configured to be stored at one or more non-transitory memory storage devices. In some embodiments, the processor(s) are similar or identical to the processor(s) described above with respect to computer system 100 (FIG. 2), and/or the non-transitory memory storage device(s) are similar or identical to the non-transitory memory storage device(s) described above with respect to computer system 100 (FIG. 2). Further, the processor(s) and/or non-transitory memory storage device(s) can be part of a water generating unit control system, which can be similar or identical to water generating unit control system 314 (FIG. 1).

Figure 10:
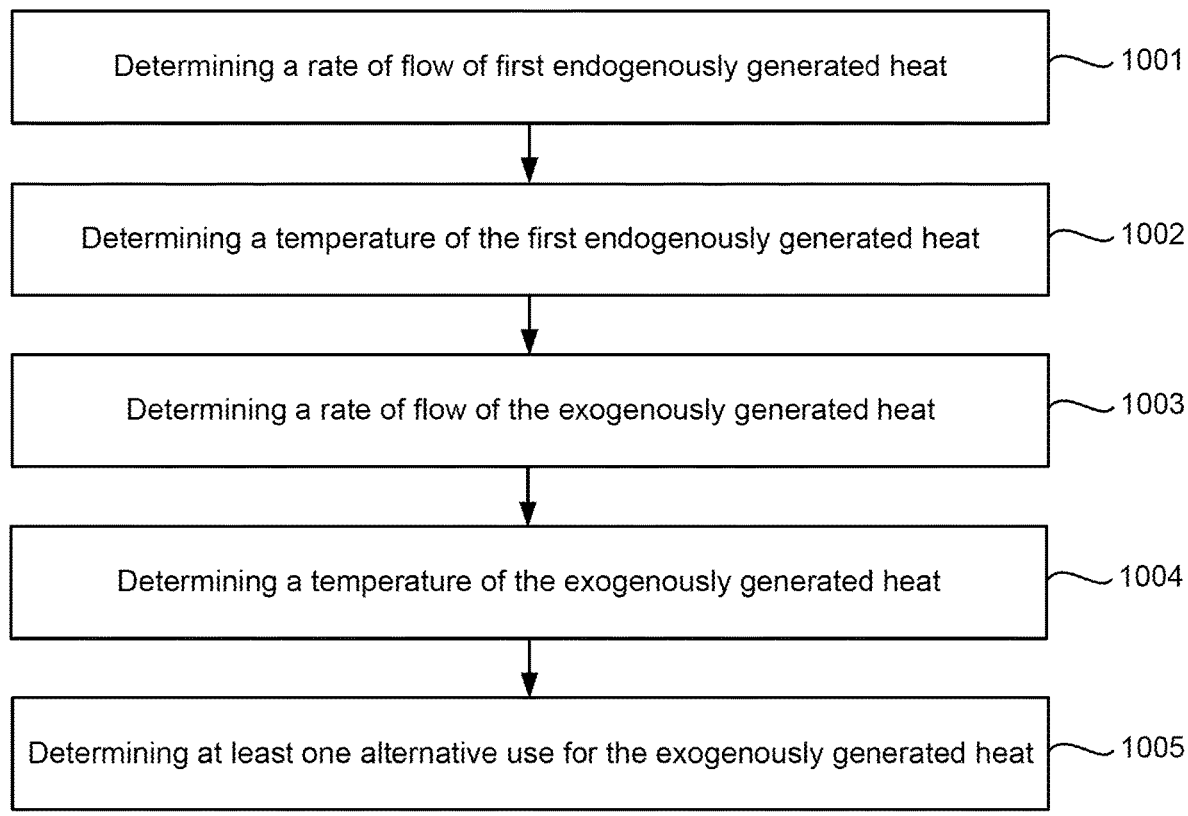
FIG. 10 illustrates a flow chart for an exemplary activity of evaluating whether to use exogenously generated heat to generate water with a water generating unit, according to various embodiments.

In various embodiments, method 900 comprises activity 901 of evaluating whether to use exogenously generated heat to generate water with a water generating unit. In some embodiments, performing activity 901 is similar or identical to evaluating whether to use exogenously generated heat to generate water with a water generating unit as described above with respect to water generating system 300 (FIG. 1) and/or water generating unit control system 314 (FIG. 1). Further, the water generating unit can be similar or identical to water generating unit 301 (FIG. 1). Also, the exogenously generated heat can be similar or identical to the exogenously generated heat generated by exogenous heat source 391 (FIG. 1) as described above with respect to water generating system 300 (FIG. 1) and/or water generating unit control system 314 (FIG. 1). FIG. 10 illustrates a flow chart for an exemplary activity 901, according to the embodiment of FIG. 10.

For example, in various embodiments, activity 901 comprises activity 1001 of determining a rate of flow of first endogenously generated heat. In various embodiments, performing activity 1001 is similar or identical to determining a rate of flow of first endogenously generated heat as described above with respect to water generating system 300 (FIG. 1) and/or water generating unit control system 314 (FIG. 1). Further, the first endogenously generated heat can be similar or identical to the endogenously generated heat generated by first endogenous heat source 302 (FIG. 1).

In various embodiments, activity 901 can comprise activity 1002 of determining a temperature of the first endogenously generated heat. In some embodiments, performing activity 1002 can be similar or identical to determining a temperature of the first endogenously generated heat as described above with respect to water generating system 300 (FIG. 1) and/or water generating unit control system 314 (FIG. 1).

In various embodiments, activity 901 comprises activity 1003 of determining a rate of flow of the exogenously generated heat. In some embodiments, performing activity 1003 is similar or identical to determining a rate of flow of the exogenously generated heat as described above with respect to water generating system 300 (FIG. 1) and/or water generating unit control system 314 (FIG. 1).

In various embodiments, activity 901 comprises activity 1004 of determining a temperature of the exogenously generated heat. In some embodiments, performing activity 1004 is similar or identical to determining a temperature of the exogenously generated heat as described above with respect to water generating system 300 (FIG. 1) and/or water generating unit control system 314 (FIG. 1).

In various embodiments, activity 901 comprises activity 1005 of determining at least one alternative use for the exogenously generated heat. In some embodiments, performing activity 1005 is similar or identical to determining at least one alternative use for the exogenously generated heat as described above with respect to water generating system 300 (FIG. 1) and/or water generating unit control system 314 (FIG. 1).

Referring again to FIG. 9, in various embodiments, method 900 comprises activity 902 of making available one or more regeneration fluids to an heat exchanger of the water generating unit. In some embodiments, performing activity 902 is similar or identical to making available one or more regeneration fluids to an heat exchanger of the water generating unit as described above with respect to water generating system 300 (FIG. 1) and/or water generating unit control system 314 (FIG. 1). Further, the heat exchanger can be similar or identical to heat exchanger 304 (FIG. 1). In some embodiments, activity 902 is performed after activity 901.

In various embodiments, method 900 comprises activity 903 of generating water with the water generating unit using the exogenously generated heat. In some embodiments, performing activity 903 is similar or identical to generating water with the water generating unit using the exogenously generated heat as described above with respect to water generating system 300 (FIG. 1) and/or water generating unit control system 314 (FIG. 1).

Figure 11:
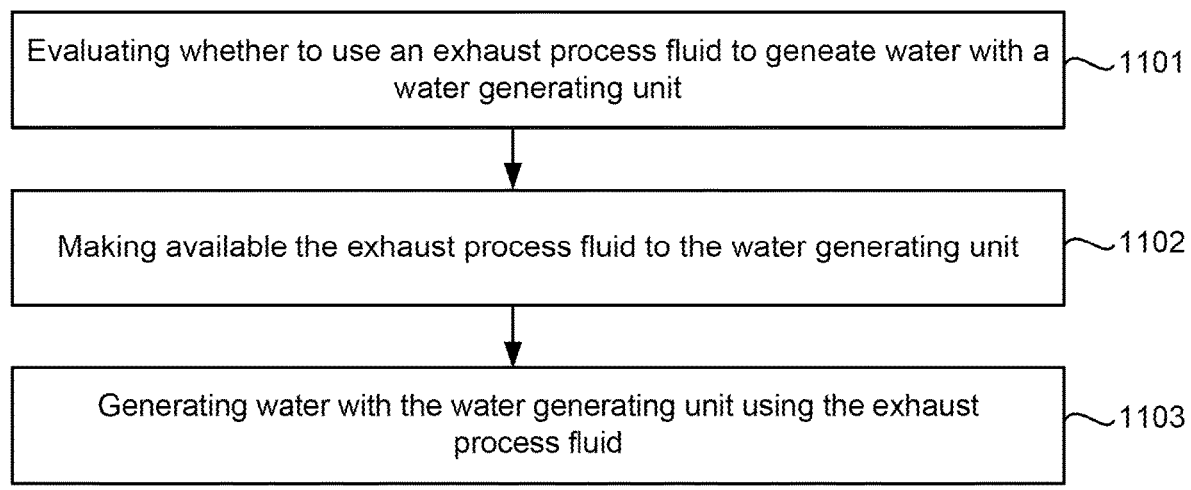
FIG. 11 illustrates a flow chart for an embodiment of a method of generating water using an exhaust process fluid, according to various embodiments.

Turning ahead again in the drawings, FIG. 11 illustrates a flow chart for an embodiment of a method 1100. Method 1100 is merely exemplary and is not limited to the embodiments presented herein. Method 1100 can be employed in many different embodiments or examples not specifically depicted or described herein. In some embodiments, the activities of method 1100 is performed in the order presented. In other embodiments, the activities of the method 1100 is performed in any other suitable order. In still other embodiments, one or more of the activities in method 1100 is combined or skipped.

In various embodiments, method 1100 is implemented via execution of computer instructions configured to run at one or more processors and configured to be stored at one or more non-transitory memory storage devices. In some embodiments, the processor(s) are similar or identical to the processor(s) described above with respect to computer system 100 (FIG. 2), and/or the non-transitory memory storage device(s) are similar or identical to the non-transitory memory storage device(s) described above with respect to computer system 100 (FIG. 2). Further, the processor(s) and/or non-transitory memory storage device(s) are part of a water generating unit control system, which can be similar or identical to water generating unit control system 314 (FIG. 1).

Figure 12:
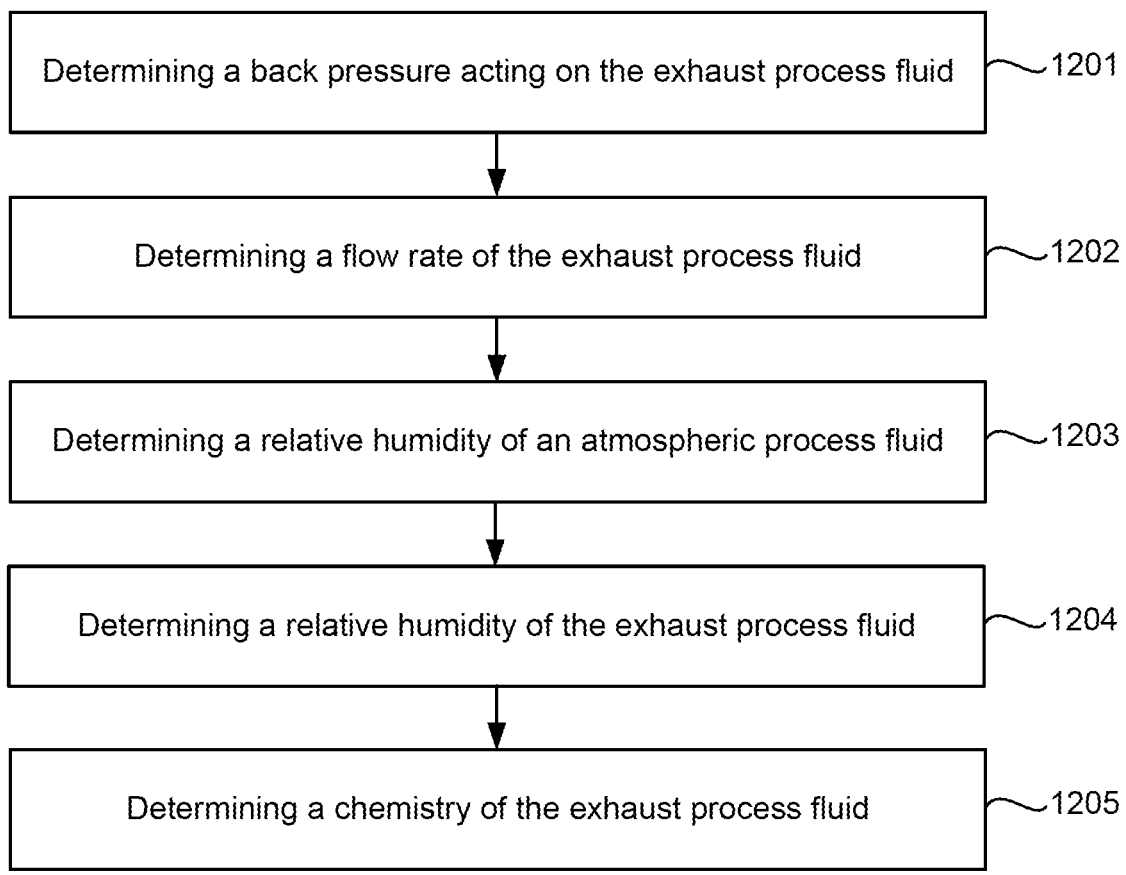
FIG. 12 illustrates a flow chart for an exemplary activity of evaluating whether to use an exhaust process fluid to generate water with a water generating unit, according to various embodiments.

In various embodiments, method 1100 comprises activity 1101 of evaluating whether to use an exhaust process fluid to generate water with a water generating unit. In some embodiments, performing activity 1101 is similar or identical to evaluating whether to use an exhaust process fluid to generate water with a water generating unit as described above with respect to water generating system 300 (FIG. 1) and/or water generating unit control system 314 (FIG. 1). Further, the water generating unit can be similar or identical to water generating unit 301 (FIG. 1). Also, the exhaust process fluid can be similar or identical to the exhaust process fluid generated by exhaust process fluid source 393 (FIG. 1) as described above with respect to water generating system 300 (FIG. 1) and/or water generating unit control system 314 (FIG. 1). FIG. 12 illustrates a flow chart for an exemplary activity 901, according to the embodiment of FIG. 11.

In various embodiments, activity 1101 comprises activity 1201 of determining a back pressure acting on the exhaust process fluid. In some embodiments, performing activity 1201 is similar or identical to determining a back pressure acting on the exhaust process fluid as described above with respect to water generating system 300 (FIG. 1) and/or water generating unit control system 314 (FIG. 1).

In various embodiments, activity 1101 comprises activity 1202 of determining a flow rate of the exhaust process fluid. In some embodiments, performing activity 1202 is similar or identical to determining a flow rate of the exhaust process fluid as described above with respect to water generating system 300 (FIG. 1) and/or water generating unit control system 314 (FIG. 1).

In various embodiments, activity 1101 comprises activity 1203 of determining a relative humidity of an atmospheric process fluid. In some embodiments, performing activity 1203 is similar or identical to determining a relative humidity of an atmospheric process fluid as described above with respect to water generating system 300 (FIG. 1) and/or water generating unit control system 314 (FIG. 1). Further, the atmospheric process fluid can be similar or identical to the atmospheric process fluid described above with respect to water generating system 300 (FIG. 1).

In various embodiments, activity 1101 comprises activity 1204 of determining a relative humidity of the exhaust process fluid. In some embodiments, performing activity 1204 is similar or identical to determining a relative humidity of the exhaust process fluid as described above with respect to water generating system 300 (FIG. 1) and/or water generating unit control system 314 (FIG. 1).

In various embodiments, activity 1101 comprises activity 1205 of determining a chemistry of the exhaust process fluid. In some embodiments, performing activity 1205 is similar or identical to determining a chemistry of the exhaust process fluid as described above with respect to water generating system 300 (FIG. 1) and/or water generating unit control system 314 (FIG. 1).

Returning to FIG. 11, in various embodiments, method 1100 comprises activity 1102 of making available the exhaust process fluid to the water generating unit. In some embodiments, performing activity 1102 is similar or identical to making available the exhaust process fluid to the water generating unit as described above with respect to water generating system 300 (FIG. 1) and/or water generating unit control system 314 (FIG. 1). In some embodiments, activity 1102 is performed after activity 1101.

In various embodiments, method 1100 comprises activity 1103 of generating water with the water generating unit using the exhaust process fluid. In some embodiments, performing activity 1103 is similar or identical to generating water with the water generating unit using the exhaust process fluid as described above with respect to water generating system 300 (FIG. 1) and/or water generating unit control system 314 (FIG. 1).

Figure 3:
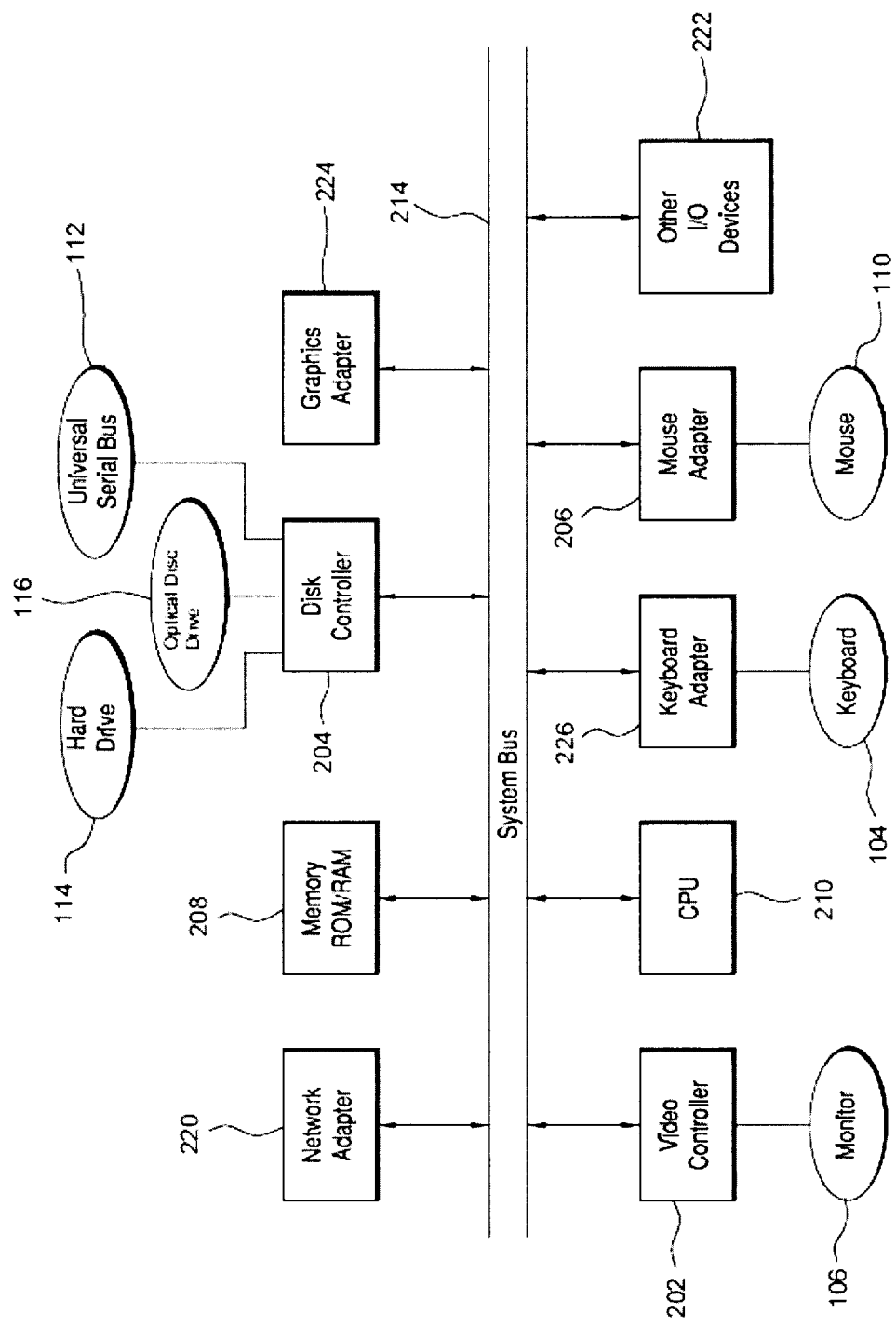
FIG. 3 illustrates a representative block diagram of exemplary elements included on the circuit boards inside a chassis of a computer system, according to various embodiments.

FIGS. 2 and 3 illustrate exemplary embodiments of a computer system 100, all of which or a portion of which can be suitable for (i) implementing part or all of one or more embodiments of the techniques, methods, and systems, and/or (ii) implementing and/or operating part or all of one or more embodiments of the memory storage devices, as described herein. For example, in some embodiments, all or a portion of computer system 100 are suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) also are appropriate for implementing part or all of one or more embodiments of the techniques, methods, and/or systems described herein.

In many embodiments, computer system 100 comprises chassis 102 containing one or more circuit boards (not shown), a Universal Serial Bus (USB) port 112, a hard drive 114, and an optical disc drive 116. Meanwhile, for example, optical disc drive 116 can comprise a Compact Disc Read-Only Memory (CD-ROM), a Digital Video Disc (DVD) drive, or a Blu-ray drive. Still, in other embodiments, a different or separate one of a chassis 102 (and its internal components) can be suitable for implementing part or all of one or more embodiments of the techniques, methods, and/or systems described herein.

In various embodiments, computer system 100 is configured to receive data from one or more sensors of water generating system 300, calculate a value from the received data, compare the value to a predetermined threshold, and control a component of water generating system 300 in response to the comparison. For example, a processor of computer system 100 may be configured to instruct water generating system 300 to open the valve(s) of the conduit(s) coupling blower 307 to exhaust process fluid source 393 in response to back pressure acting on the exhaust process fluid lower than a predetermined pressure. A processor of computer system 100 may be configured to instruct water generating system 300 to open the valve(s) of the conduit(s) coupling blower 307 to exhaust process fluid source in response to a flow rate of exhaust process fluid below a predetermined flow rate. A processor of computer system 100 may be configured to instruct water generating system 300 to close the electrical switch(es) of the electrical line configured to electrically couple exogenous electricity source 392 to second endogenous heat source 303 and/or open the valve(s) of the conduit(s) configured to make available the regeneration fluid(s) to second endogenous heat source 303 in response to: a buy back rate of the exogenously generated electricity generated by exogenous electricity source 392 lower than or equal to a predetermined buy back rate, an available electric power greater than a predetermined potential electric power, a temperature of an inverter of exogenous electricity source greater than or equal to a predetermined temperature, an available quantity of stored water less than a predetermined quantity of stored water, a forecasted ambient air relative humidity below a predetermined humidity, and/or a quantity of materials toxic to humans, pets, and/or other materials in the process fluid(s) at a predetermined quantity.

FIG. 3 illustrates a representative block diagram of exemplary elements included on the circuit boards inside chassis 102 (FIG. 2). For example, a central processing unit (CPU) 210 is coupled to a system bus 214. In various embodiments, the architecture of CPU 210 can be compliant with any of a variety of commercially distributed architecture families.

In various embodiments, system bus 214 also is coupled to a memory storage unit 208, where memory storage unit 208 comprises (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

The memory storage device(s) of the various embodiments disclosed herein can comprise memory storage unit 208, an external memory storage drive (not shown), such as, for example, a USB-equipped electronic memory storage drive coupled to universal serial bus (USB) port 112 (FIGS. 2 & 3), hard drive 114 (FIGS. 2 & 3), optical disc drive 116 (FIGS. 2 & 3), a floppy disk drive (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 100 (FIG. 2) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 100 (FIG. 2). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) iOS™ by Apple Inc. of Cupertino, Calif., United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Wash., United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 3, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 2 & 3) and mouse 110 (FIGS. 2 & 3), respectively, of computer system 100 (FIG. 2). While graphics adapter 224 and video controller 202 are indicated as distinct units in FIG. 3, video controller 202 can be integrated into graphics adapter 224, or vice versa in other embodiments. Video controller 202 is suitable for refreshing monitor 106 (FIGS. 2 & 3) to display images on a screen 108 (FIG. 2) of computer system 100 (FIG. 2). Disk controller 204 can control hard drive 114 (FIGS. 2 & 3), USB port 112 (FIGS. 2 & 3), and CD-ROM drive 116 (FIGS. 2 & 3). In other embodiments, distinct units can be used to control each of these devices separately.

Network adapter 220 can be suitable to connect computer system 100 (FIG. 2) to a computer network by wired communication (e.g., a wired network adapter) and/or wireless communication (e.g., a wireless network adapter). In some embodiments, network adapter 220 is plugged or coupled to an expansion port (not shown) in computer system 100 (FIG. 2). In other embodiments, network adapter 220 is built into computer system 100 (FIG. 2). For example, network adapter 220 can be built into computer system 100 (FIG. 2) by being integrated into the motherboard chipset (not shown), or implemented via one or more dedicated communication chips (not shown), connected through a PCI (peripheral component interconnector) or a PCI express bus of computer system 100 (FIG. 2) or USB port 112 (FIG. 2).

Returning now to FIG. 2, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage device(s) of the various embodiments disclosed herein can be executed by CPU 210 (FIG. 3). At least a portion of the program instructions, stored on these devices, can be suitable for carrying out at least part of the techniques, methods, and activities of the methods described herein. In various embodiments, computer system 100 can be reprogrammed with one or more systems, applications, and/or databases to convert computer system 100 from a general purpose computer to a special purpose computer.

Further, although computer system 100 is illustrated as a desktop computer in FIG. 2, in many examples, computer system 100 can have a different form factor while still having functional elements similar to those described for computer system 100. In some embodiments, computer system 100 comprises a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 comprises an embedded system.

Although the disclosure has been made with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-12 may be modified, and that the foregoing discussion of certain of these embodiments does not necessarily represent a complete description of all possible embodiments. For example, one or more of the activities of the methods described herein may include different activities and be performed by many different elements, in many different orders. As another example, the elements within water generating system 300 (FIG. 1) can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A water generating system comprising:
   a water generating unit comprising a first endogenous heat source configured to generate heat, a desiccation device coupled the first endogenous heat source, a condenser coupled to the desiccation device;
   a second endogenous heat source configured to generate heat;
   a heat exchanger configured to receive heat from an exogenous heat source; and,
   a control system configured to supplement or substitute the heat generated by the first endogenous heat source by controlling use of the heat generated by the second endogenous heat source, the heat received by the heat exchanger, or a combination thereof.

2. The water generating system of claim 1, wherein the first endogenous heat source comprises a solar thermal heater.

3. The water generating system of claim 1, wherein the first endogenous heat source further comprises a photovoltaic cell configured to generate electricity.

4. The water generating system of claim 3, wherein the second endogenous heat source is an electric heater.

5. The water generating system of claim 4, wherein the second endogenous heat source is configured to receive electricity generated by the photovoltaic cell, an exogenous electricity source, or a combination thereof.

6. The water generating system of claim 1, generating wherein the desiccation device comprises a desiccant and a housing, and wherein the housing defines an adsorption zone and a desorption zone;
   a blower configured to receive a process fluid and move the process fluid to the adsorption zone of the desiccation device;

a circulator configured to receive a regeneration fluid and operably move and repeatedly cycle the regeneration fluid from the heat generator to the desorption zone of the desiccation device to the condenser, and back to the heat generator; and an actuator configured to operably move and repeatedly cycle the desiccant, or portions thereof, between the adsorption zone and desorption zone to capture water from the process fluid received at the adsorption zone and to desorb water into the regeneration fluid received at the desorption zone.

7. The water generating system of claim 6, wherein the control system is configured to control:
   use, by the water generating unit, of exhaust process fluid generated by the exhaust process fluid source,
   use, by the water generating unit, of electricity generated by an exogenous electricity source,
   use, by the water generating unit, of heat generated by the exogenous heat source,
   a speed at which the blower moves the process fluids,
   a speed at which the circulator moves the regeneration fluid,
   a speed at which the actuator moves the desiccant element, or a combination thereof.

8. The water generating system of claim 7, wherein the control system communicates with one or more sensors, wherein the one or more sensors are configured to detect:
   an ambient air temperature at the water generating unit,
   an ambient air relative humidity at the water generating unit,
   a temperature of the exhaust process fluid,
   a temperature of the heat generated by the first endogenous heat source,
   a temperature of the heat generated by the second endogenous heat source,
   a heat rate of flow of the heat generated by the first endogenous heat source,
   a heat rate of flow of the heat generated by the second endogenous heat source,
   a temperature of the heat received by the heat exchanger,
   a heat rate of flow of the heat received by the heat exchanger, or a combination thereof.

9. The water generating system of claim 8, wherein the control system employs a control algorithm configured to determine optimal control conditions for one or more of the blower, the circulator, and the actuator, relative to each other, as a function of:
   the ambient air temperature at the water generating unit,
   the ambient air relative humidity at the water generating unit,
   the temperature of the exhaust process fluid,
   a relative humidity of the exhaust process fluid,
   the temperature of the heat generated by the first endogenous heat source,
   the heat rate of flow of the heat generated by the first endogenous heat source,
   the temperature of the heat generated by the second endogenous heat source,
   the heat rate of flow of the heat generated by the second endogenous heat source,
   the temperature of the heat received by the heat exchanger,
   the heat rate of flow of the heat received by the heat exchanger, or a combination thereof.

10. The system of claim 1, wherein at least one of the first endogenous heat source, the second endogenous heat source, and the heat exchanger are coupled in parallel with at least one other of the first endogenous heat source, the second endogenous heat source, and the heat exchanger.

11. The system of claim 1, wherein the control system is configured to control when the water generating unit uses heat from only one of the first endogenous heat source, the second endogenous heat source, and the heat exchanger to generate water.

12. The system of claim 1, wherein the control system is configured to control, based on sensed information detected by one or more sensors, use of the heat generated by the second endogenous heat source, the heat received by the heat exchanger, or a combination thereof.

13. The system of claim 1, wherein the control system is configured to:
   determine an available electric power of an electricity source; and,
   control, based on the available electric power, use of the heat generated by the second endogenous heat source, the heat received by the heat exchanger, or a combination thereof.

14. The system of claim 1, wherein the control system is configured to:
   determine an available quantity of water; and,
   control, based on the available quantity of water, use of the heat generated by the second endogenous heat source, the heat received by the heat exchanger, or a combination thereof.

15. The system of claim 1, further comprising an electricity source configured to generate electricity used by the second endogenous heat source of the water generating unit; and, wherein the control system is configured to make the electricity available to the second endogenous heat source.

16. The system of claim 15, wherein the control system is configured to evaluate whether to use the electricity to generate water with the water generating unit by determining:
   a buy back rate of the electricity generated by the exogenous electricity source,
   a temperature of an inverter of the electricity source,
   an available electric power of the electricity generated by the electricity source,
   a potential available electric power of the electricity generated by the electricity source,
   or a combination thereof.

17. The system of claim 1, wherein the control system communicates with one or more databases to retrieve an available electric power, a water use pattern, a forecast of weather, a location of the water generating unit, or a combination thereof.

18. A water generating unit comprising:
   a first endogenous heat source;
   a second endogenous heat source;
   a heat exchanger configured to receive heat from an exogenous heat source;
   a desiccation device configured to receive heat from the first endogenous heat source, second endogenous heat source, and the heat received by the heat exchanger;
   wherein at least one of first endogenous heat source, the second endogenous heat source, and the heat exchanger are coupled in parallel with at least one other of the first endogenous heat source, the second endogenous heat source, and the heat exchanger;
   a control system configured to supplement or substitute the heat generated by the first endogenous heat source by controlling use of the heat generated by the second endogenous heat source, the heat received by the heat exchanger, or a combination thereof.

19. A system comprising:
a water generating unit comprising:
- a first endogenous heat source;
- a second endogenous heat source;
- a heat exchanger configured to receive heat from an exogenous heat source;
- a desiccation device configured to receive heat from the first endogenous heat source, the second endogenous heat source, and the heat received by the heat exchanger;
- one or more sensors configured to detect sensed information;
- a control system configured to supplement or substitute the heat generated by the first endogenous heat source by controlling, based on the sensed information, use of the heat generated by the second endogenous heat source, the heat received by the heat exchanger, or a combination thereof.

* * * * *